(12) United States Patent
Fujimori

(10) Patent No.: US 6,350,033 B1
(45) Date of Patent: Feb. 26, 2002

(54) PROJECTOR

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/436,214

(22) Filed: Nov. 9, 1999

(30) Foreign Application Priority Data

| Nov. 10, 1998 | (JP) | 10-319029 |
| Nov. 26, 1998 | (JP) | 10-336341 |
| Nov. 26, 1998 | (JP) | 10-336342 |
| Jan. 25, 1999 | (JP) | 11-015560 |

(51) Int. Cl.$^7$ .................. G03B 21/18; G03B 21/26; G03B 21/16; G03B 21/14; G03B 21/22

(52) U.S. Cl. .................... 353/61; 353/60; 353/119; 353/56

(58) Field of Search ............... 353/57, 60, 61, 353/119, 59, 58, 56

(56) References Cited

U.S. PATENT DOCUMENTS 5,676,442 A * 10/1997 Fujimori ................ 353/119
5,738,427 A * 4/1998 Booth et al. ............. 353/57
6,007,205 A 12/1999 Fujimori ................ 353/57
6,280,038 B1 * 8/2001 Fuse et al. .............. 353/57

FOREIGN PATENT DOCUMENTS

| JP | 5-4147 | 1/1993 |
| JP | 5-53200 | 3/1993 |
| JP | 6-148594 | 5/1994 |
| JP | 8-22074 | 1/1996 |
| JP | 8-179424 | 7/1996 |

* cited by examiner

Primary Examiner—Russell Adams
Assistant Examiner—Magda Cruz
(74) Attorney, Agent, or Firm—Oliff & Berridge, PLC

(57) ABSTRACT

A projector is provided that may include an enclosing structure for enclosing an optical path from an electro-optical apparatus to a projection lens, and an air circulation path connected to the enclosing structure and disposed in a flow path for cooling air. Thus, air inside the enclosing structure can be efficiently cooled while preventing the entry of dust or oil mist.

66 Claims, 22 Drawing Sheets

PROJECTOR

BACKGROUND OF THE INVENTION

1. Field of Invention

The present invention relates to a projector including a light source, an optical modulation device for modulating a luminous flux emitted from the light source according to image information, and a projection lens for enlarging and projecting an image formed by the optical modulation device.

2. Description of Related Art

Hitherto, projectors have been used which include a light source, an optical system for forming an image by a luminous flux emitted from the light source according to image information, and a projection lens for enlarging and projecting the image formed by the optical system onto a projection plane. The optical system consists of an illuminating optical system for producing a uniform in-plane illumination distribution of a luminous flux emitted from the light source, a color separation optical system for separating the luminous flux from the illuminating optical system into three primary colors of red, blue, and green, an optical modulation system including an electro-optical apparatus for modulating color luminous fluxes according to image information, and a color-synthesizing optical system for synthesizing modulated color luminous fluxes. The electro-optical apparatus includes three optical modulation devices for modulating each of a red luminous flux, a blue luminous flux and a green luminous flux separated by the color separation optical system according to image information. For example, a liquid crystal panel using a polysilicon TFT as a switching element is used.

Since the optical modulation devices are important portions for forming an optical image according to image information, if dust or oil mist adheres to the surface of the liquid crystal panel, the image quality of the projector will deteriorate. For this reason, a projector including an enclosing structure for enclosing an optical path from the optical modulation devices to the projection lens may be adopted. Since such a projector can prevent the entry of dust or oil mist from the outside by the enclosing structure, dust or oil mist does not adhere to the surface of the liquid crystal panel of the optical modulation device, and the image quality of the projector can be stably secured over a long period of time. Such a projector is suitably used as a stationary projector, such as a hanging-type projector.

However, since the optical modulation device, such as the liquid crystal panel, is easily affected by heat, if the optical path from the optical modulation device to the projection lens is enclosed by the enclosing structure, it is difficult to efficiently cool the optical modulation device by introducing cooling air from the outside. In particular, in a recent trend toward an increase in brightness and a reduction in size of the projector, efficiently cooling the optical modulation device is an important problem.

On the other hand, the electro-optical apparatus is usually mounted on a structure to which the projection lens is attached. Thus, in order to enclose an optical path from the electro-optical apparatus to the projection lens, a large enclosing structure for enclosing the electro-optical apparatus and the structure is required, and it is therefore difficult to reduce the size of the projector.

SUMMARY OF THE INVENTION

It is an aspect of the present invention to provide a projector capable of efficiently cooling an electro-optical apparatus, and of stably securing the image quality for a long period of time.

It is another aspect of the present invention to provide a projector capable of preventing dust from adhering to an electro-optical apparatus by enclosing an optical path from the electro-optical apparatus to a projection lens, and of reducing the size of the device.

According to the first aspect of the present invention, there is provided a projector having a light source, an electro-optical apparatus for modulating a luminous flux emitted from the light source according to image information, and a projection lens for enlarging and projecting an image formed by the electro-optical apparatus, the projector may include an enclosing structure for enclosing an optical path from the electro-optical apparatus to the projection lens, and an air circulation path for circulating air of the enclosing structure, wherein the air circulation path is disposed in a flow path for cooling air formed inside the projector.

The enclosing structure can be formed by a box-like member for sealing and accommodating therein the electro-optical apparatus. The box-like member made of metal, such as magnesium alloy, may be adopted. In addition, the air circulation path can be formed by, for example, a pipe-like member connected to the upper portion of the enclosing structure at one end thereof, and connected to the lower portion of the enclosing structure. In short, the air circulation path may have a structure such that it can circulate air inside the enclosing structure from above to the below, or from below to above while holding sealing performance of the enclosing structure. Furthermore, in order to circulate internal air, a forcible circulation device, such as a fan, may preferably be provided inside the enclosing structure. As the forcible circulation device, a common axial flow fan can be adopted. However, a centrifugal fan for exhausting air drawn by the rotation of the fan in the direction tangential to the rotation may preferably be adopted.

According to the present invention, since the air circulation path is disposed in a flow path for cooling air formed inside the projector, the air circulation path is cooled and the air flowing in the air circulation path is cooled. The cooled air inside the air circulation path circulates inside the enclosing structure, whereby the electro-optical apparatus can be efficiently cooled. In addition, since the air for cooling the electro-optical apparatus circulates only in the enclosing structure and the air circulation path, dust or oil mist does not enter from the outside, and image quality of the projector can be stably secured for a long period of time.

In the foregoing, the air circulation path may preferably be formed by a metal pipe-like member. Since the pipe-like member made of metal, such as copper, aluminum or the like, has high heat-radiating performance, air inside the air circulation path can be further efficiently cooled if it is disposed in the flow path for cooling air inside the projector. In addition, when the above-described centrifugal fan is adopted as the forcible circulation device, the air inside the enclosing structure can be sufficiently circulated by the centrifugal fan, considering the length of the flow path of the air circulation path in which discharge pressure of the centrifugal fan is substantially equal to the area of the air outlet of the centrifugal fan. In this case, the inside diameter of the pipe-like member may preferably be set at 10 mm to 30 mm.

In addition, the air circulation path may preferably be detachable to the enclosing structure and the air circulation path and the enclosing structure may preferably be connected via a seal material. In this way, since the enclosing structure and the air circulation path are detachable, maintenance of the electro-optical apparatus inside the enclosing structure can be easily carried out. In addition, since the air circulation path and the enclosing structure is connected via the seal material, it is possible to securely prevent air leakage inside the enclosing structure. Furthermore, even if the enclosing structure and the air circulation path are made of different metals such that the material of the enclosing structure is a magnesium alloy and the material of the air circulation path is aluminum, since they are connected by the seal material, such as rubber, electrolytic corrosion does not occur at a joint portion between two different metals, and sealing performance of the enclosed structure can be permanently secured.

Furthermore, the air circulation path may include a radiating structure for releasing heat inside the air circulation path to the outside. Here, the radiating structure may be composed of a plurality of radiating fins extending toward the outside of the radial direction of the air circulation path. In addition, as another example, a radiating structure constructed by spirally winding a linear material comprising a linear core member and a plurality of radiating pieces projected toward the outside of the radial direction of the core member around the air circulation path may be adopted.

Since the air circulation path includes the radiating structure, if the air circulation path is disposed in the flow path for cooling air inside the projector, air inside the air circulation path can be more effectively cooled by the cooling air.

Furthermore, the air circulation path may preferably be disposed aside the projection lens. Since such a projection lens has an optical adjusting mechanism, such as zooming or focusing, the length of the projection lens is elongated and a dead space tends to be formed aside the projection lens. Therefore, if the air circulation path is disposed aside the projection lens, it is possible to provide a tight inner structure of the projector, and the projector is advantageously reduced in size.

A cooling fan for cooling the inside of the projector may preferably be provided in the vicinity of the air circulation path. Here, the cooling fan is not limited to a special one for spraying cooling air to the air circulation path, and may be a cooling fan provided to cool other portions of the projector.

In this way, since the cooling fan is provided in the vicinity of the air circulation path, the air circulation path can be further efficiently cooled by forcible introduction or exhaustion of the cooling air effected by the cooling fan.

According to another aspect of the present invention, there is provided a projector having a light source, an electro-optical apparatus for modulating a luminous flux emitted from the light source according to image information, and a projection lens for enlarging and projecting an image formed by the electro-optical apparatus, the projector may include an enclosing structure for enclosing an optical path from the electro-optical apparatus to the projection lens; and an air circulation path connected to the enclosing structure, and circulating air inside the enclosing structure, wherein a circulating fan for flowing air inside the enclosing structure to the air circulation path is disposed inside the enclosing structure.

In this way, since the circulating fan is provided inside the enclosing structure, it is possible to forcibly circulate air inside the enclosing structure through the air circulation path. Therefore, by making thermal exchange between the air circulating inside the enclosing structure and the electro-optical apparatus, the electro-optical apparatus can be efficiently cooled. In addition, since the electro-optical apparatus is enclosed by the above-described enclosing structure, dust or the like does not adhere to the electro-optical apparatus, and the image quality can be stably secured for a long period of time.

In the foregoing, the circulating fan may preferably be a centrifugal fan for exhausting air drawn by the rotation of the fan in the direction tangential to the rotation. In this way, by adopting the centrifugal fan, high pressure of the air when exhausted can be obtained and therefore, the air inside the enclosing structure can be securely circulated using the magnitude of the discharge pressure. In addition, since the centrifugal fan generates high discharge pressure as compared with a normal axial flow fan, noise produced by the rotation of the fan can be minimized by rotating the fan at low speed.

In addition, the enclosing structure may preferably have an electro-optical apparatus placing portion for placing the electro-optical apparatus, and the centrifugal fan may preferably be disposed above the electro-optical apparatus, and an intake surface thereof may oppose the electro-optical apparatus placing portion. In this way, since the centrifugal fan is disposed above the electro-optical apparatus, and the intake surface thereof opposes the electro-optical apparatus placing portion, the electro-optical apparatus is disposed in the air circulating flow on the side of the intake portion of the centrifugal fan, it is possible to uniformly cool the electro-optical apparatus.

Furthermore, the enclosing structure may preferably have a projection-lens mounting portion for mounting thereto the projection lens, a flange projecting toward the outside of the radial direction of the projection lens may preferably be provided at the base end of the projection lens, and the flange and the projection-lens mounting portion are joined, whereby the projection lens is mounted to the enclosing structure, and the centrifugal fan may preferably be disposed at a portion corresponding to an inner area of the outer peripheral edge of the flange in the radial direction so as not to project toward the outside of the radial direction of the outer peripheral edge of the flange.

If the centrifugal fan is disposed in this way, it is possible to prevent the centrifugal fan from projecting to the outside of the flange, and by reducing the size of the enclosing structure, the projector can be reduced in size and thickness.

In addition, the air circulation path may preferably be composed of a pipe-like member connected to an air outlet of the centrifugal fan at one end thereof, and connected to a lower portion of the enclosing structure at the other end thereof. In this way, since the pipe-like member constituting the air circulation path is connected to the air outlet of the centrifugal fan, while air that has cooled the electro-optical apparatus and has been drawn by the centrifugal fan circulates in the pipe-like member constituting the air circulation path. Therefore, if the pipe-like member is disposed in the flow path for the cooling air inside the projector to perform cooling, the air inside the enclosing structure can be efficiently cooled by heat exchange between the pipe-like member and air. By ejecting the cooled air from the connecting portion of the other end of the air circulation path, the electro-optical apparatus can be cooled.

The electro-optical apparatus may include a plurality of optical modulation devices for modulating the luminous flux according to the image information, and a straightening plate for dividing air ejected from the air circulation path according to the layout of the plurality of optical modulation devices may preferably be provided inside the enclosing structure. Since the straightening plate is provided in this way, the air cooled in the air circulation path can be guided according to heating condition of the plurality of optical modulation devices, and the electro-optical apparatus can be further efficiently cooled.

In addition, the plurality of optical modulation devices may preferably be a red optical modulation device, a green optical modulation device, and a blue optical modulation device for modulating each of a red luminous flux, a green luminous flux, and a blue luminous flux. The straightening plate may preferably be constructed so as to guide the air ejected from the air circulation path in the order of the blue optical modulation device, the green optical modulation device, and the red optical modulation device.

The ranking of heating value of the above-described optical modulation devices, from highest to lowest is the blue optical modulation device, the green optical modulation device, and the red optical modulation device. Therefore, if the air from the air circulation path is guided in the above order, it is possible to suitably cool each of the optical modulation device according to demand.

Furthermore, the electro-optical apparatus may preferably include an optical modulation device for modulating the luminous flux according to the image information, and a clearance of 1 mm to 5 mm may preferably be formed between the enclosing structure and the optical modulation device. In this way, if this degree of clearance is formed between the enclosing structure and the optical modulation device, the air inside the enclosing structure can be suitably circulated along the clearance, thus making it possible to further efficiently cool the electro-optical apparatus. When the clearance size is set at 5 mm or more, the velocity of air flowing in the clearance decreases and the optical modulation device cannot be efficiently cooled, while setting the clearance size at 1 mm or less makes it difficult to manage layout accuracy of the side plates and the optical modulation device. Therefore, the clearance size may preferably be set at 1 mm to 5 mm.

According to still another aspect of the present invention, there is provided a projector having a light source, an electro-optical apparatus for modulating a luminous flux emitted from the light source according to image information, and a projection lens for enlarging and projecting an image formed by the electro-optical apparatus. The projector may include an enclosing structure for enclosing an optical path from the electro-optical apparatus to the projection lens, wherein the enclosing structure is provided with a cooling structure for cooling internal air.

Here, the cooling structure may preferably be formed of, for example, a plurality of cooling fins provided on the outer peripheral portion of the enclosing structure, a Peltier element, and a graphite sheet. Since such a cooling fin, peltier element, and a graphite sheet have high thermal conductivity and heat radiation, it is possible to cool the electro-optical apparatus by cooling the entire enclosing structure so as to cool air therein by a cooling fan or the like provided inside the projector.

Among them, the cooling fin may preferably include a metal base plate, and a plurality of columnar projections projected on the base plate. By adopting the cooling fin as described above, external air is drawn in as cooling air. If the cooling fan is disposed above the enclosing structure and directly below the intake fan, a large surface area of the columnar projections contacting the cooling air is maintained, heat is actively radiated to the cooling air, whereby cooling efficiency is increased. Furthermore, since the cooling air abutted against the base plate flows out in random directions by the valleys formed among the columnar projections, the enclosing structure disposed below the columnar projections can be uniformly cooled.

The cooling structure may preferably be composed of a Peltier element provided on the outer periphery of the enclosing structure. In this way, by providing the Peltier element having high thermal conductivity on the outer periphery of the enclosing structure, heat accumulated in the enclosing structure can be quickly absorbed, and the enclosing structure can be effectively cooled.

In addition, a circulating fan for circulating air inside the enclosing structure may preferably be provided above or below the electro-optical apparatus, and the Peltier element may preferably be provided on the outer periphery of the enclosing structure located on the opposite side of the circulating fan across the electro-optical apparatus. Since the Peltier element is provided in this way, air inside the enclosing structure is sent by the circulating fan to a portion where the Peltier element is provided after cooling the electro-optical apparatus. Therefore, heat exchange is quickly made between the air inside the enclosing structure after cooling the electro-optical apparatus and the Peltier element through the enclosing structure, whereby cooling efficiency of the air inside of the enclosing structure is increased.

Furthermore, the circulating fan may preferably be provided above the electro-optical apparatus, and may include a metal outer casing for accommodating components of the projector including the electro-optical apparatus, and the Peltier element may preferably be provided on the lower surface of the enclosing structure, and be fixed to the inner surface of the outer casing by a thermal conductor having adhesive property. In this way, since the circulating fan is provided above the electro-optical apparatus, and the Peltier element is fixed between the enclosing structure and the metal outer casing by the thermal conductor having adhesive property, the heat accumulated in the enclosing structure is securely and quickly transmitted to the outer casing via the Peltier element, and the overall external casing has the function of cooling fin, whereby the enclosing structure can be efficiently cooled.

The cooling structure may preferably be composed of a graphite sheet connected to the enclosing structure at one end thereof, and connected to a metal part constituting the projector at the other end thereof. In this way, the graphite sheet connected to the metal part of the projector has high thermal conductivity, and the heat of the enclosing structure is transmitted to the metal part via the graphite sheet, whereby the enclosing structure can be efficiently cooled.

In addition, the projector may preferably further include a metal outer casing for accommodating components of the projector including the electro-optical apparatus, and the graphite sheet may preferably be disposed between the lower surface of the enclosing structure and the inner surface of the outer casing in an urged state with a platelike material bent. In this way, since a sheet of the graphite sheet is disposed between the enclosing structure and the outer casing in an urged state, adhesion of both members can be secured without using a bonding agent or the like, and assembling work can be simplified.

Furthermore, a recess for accommodating the graphite sheet may preferably be formed in the inner surface of the outer casing on which the graphite sheet is disposed. In this way, since the graphite sheet is accommodated on the bottom surface of the recess whose height is lower than the periphery by one step, the graphite sheet does not shift during assembly, and assembling work can be further facilitated.

The projector may preferably further include an intake fan for guiding external air to the inside of the device as cooling air, and a cover member for guiding the cooling air drawn by the intake fan to the outer peripheral portion of the enclosing structure, the graphite sheet may preferably have an upstanding surface formed by bending a part of an edge of a platelike material, and be disposed on the upper surface of the enclosing structure, and the upstanding surface may preferably be connected to the cover member. In this way, since flowing of the cooling air toward the projection lens is controlled by the upstanding surface, the enclosing structure can be efficiently cooled.

According to another aspect of the present invention, there is provided a projector having a light source, an electro-optical apparatus for modulating a luminous flux emitted from the light source according to image information, and a projection lens for enlarging and projecting an image formed by the electro-optical apparatus. The projector may include an enclosing structure for enclosing an optical path from the electro-optical apparatus to the projection lens; and an optical component housing for accommodating and disposing optical components, such as a lens and a mirror, and disposed adjacent to the enclosing structure, wherein an intake fan for drawing external air to the inside of the projector is disposed above the enclosing structure, and a cooling-air introduction path for guiding cooling air drawn by the intake fan is formed in a boundary of the enclosing structure and the optical component housing.

In this way, since the cooling-air introduction path is formed, the overall enclosing structure can be cooled by the cooling air drawn by the intake fan, the air inside the enclosing structure can be further efficiently cooled together with the above-described air circulation path, thus making it possible to prevent temperature rise of the optical modulation device.

In the foregoing, the cooling-air introduction path may preferably be a clearance formed along a boundary of the enclosing structure and the optical component housing, and the clearance size may preferably be set at 1 mm to 10 mm. If the cooling-air introduction path is formed in this way, the cooling-air introduction path can be constructed without separately providing a duct or the like. Therefore, the inner structure of the projector can be simplified, and cooling efficiency can be maintained by the cooling-air introduction path.

In addition, a cover member may preferably be provided between the boundary of the optical component housing along the cooling-air introduction path and the intake fan so as to surround the cooling-air introduction path. In this way, since the cover member is provided, it is possible to necessarily and sufficiently guide the cooling air from the cooling fan to the cooling-air introduction path, thus further increasing cooling efficiency of the enclosing structure.

Furthermore, the projector may preferably further include a driving circuit board disposed above the optical component housing to drive the electro-optical apparatus, and a cooling-air introducing opening for partially guiding cooling air from the cooling fan to the driving circuit board may preferably be formed in the cover member. Here, the size of the cooling-air introducing opening can be suitably set according to the size of the driving circuit board and heating condition of the circuit element mounted thereon during driving. That is, since the cooling-air introducing opening is formed in the cover member, the cooling air from the intake fan can be partially guided to the driving circuit board to be cooled, making it possible to suitably cool the heating portion inside the projector.

The projector may preferably further include an outer casing for accommodating therein the optical component housing and the electro-optical apparatus, and an exhaust fan for exhausting air inside the outer casing to the outside, and an exhausting flow path for guiding cooling air cooled the enclosing structure to the exhaust fan may preferably be provided between the lower surface of the optical component housing and the inner bottom surface of the outer casing. In this way, since the exhausting flow path is provided, the cooling air drawn from the cooling fan is quickly exhausted form the exhaust fan via the exhausting flow path after cooling the enclosing structure, whereby cooling efficiency of the enclosing structure is further increased. In addition, by constructing the exhausting flow path in this way, the inner structure of the projector can be simplified similar to the above-described cooling-air introduction path. Moreover, the cooling air flows on the lower portion of the optical component housing, whereby the optical components, such as a lens and a mirror, disposed inside the housing can be cooled.

In addition, the electro-optical apparatus may preferably have an optical modulation device comprising a pair of substrates and an electro-optical substance clamped between the substrates, and a material having a thermal conductivity of 10 W/m·K or more may preferably be used for at least one of the substrate. Since the optical modulation device includes such materials, heat generated on the optical modulation device by blocking a part of emitted luminous flux can be efficiently exchanged with the air inside the enclosing structure, and cooling efficiency of the optical modulation device in the enclosing structure can be extremely increased.

According to a another aspect of the present invention, there is provided a projector having a light source, an electro-optical apparatus for forming an image from a luminous flux emitted from the light source according to image information, and a projection lens for enlarging and projecting an image formed by the electro-optical apparatus. The projector may include a structure including an electro-optical apparatus placing portion for placing the electro-optical apparatus and a projection-lens mounting portion for mounting the projection lens, and an enclosing structure including an enclosing member attached to the electro-optical apparatus placing portion to enclose an optical path from the electro-optical apparatus to the projection lens.

The enclosing member can be formed by a box-like member for accommodating therein the electro-optical apparatus. The box-like member made of metal, such as magnesium alloy, may be adopted. In addition, the enclosing member can be adopted which includes a first cover member attached to the electro-optical apparatus placing portion, and a second cover member attached to the opposite side of the electro-optical apparatus placing portion.

Furthermore, the first cover member can be adopted which includes a first side plate disposed on the electro-optical apparatus placing portion so as to surround the electro-optical apparatus, and a second side plate disposed substantially in parallel with the electro-optical apparatus placing portion to cover an end face of the first side plate.

According to the present invention as described above, since the enclosing structure is attached to the electro-optical apparatus placing portion, the enclosing structure for enclosing the electro-optical apparatus can be formed by the electro-optical apparatus placing portion and the enclosing member, whereby dust or the like can be securely prevented from adhering to the electro-optical apparatus. In addition, since the enclosing structure is formed by utilizing the electro-optical apparatus placing portion of the structure, the cost of manufacturing the projector can be reduced, and the projector can be easily reduced in size. In addition, if the enclosing member includes the first cover member and the second cover member and furthermore, if the first cover member is composed of the first side plate and the second side plate, the overall structure of the enclosing structure can be simplified by simplifying the structure of each cover member, the enclosing member can be reduced in size, and the projector can be reduced in size.

In the foregoing, the electro-optical apparatus may preferably include an optical modulation device for modulating the luminous flux according to the image information, and an opening for guiding the luminous flux to the optical modulation device may preferably be formed in the first side plate. In this way, since the opening for guiding a luminous flux to the optical modulation device is formed, the luminous flux emitted from the light source can be suitably modulated by the optical modulation device and emitted from the projection lens, whereby the projector can be positively operated.

A transparent plate may preferably be attached to the opening via a seal material. In this way, since the transparent plate is attached to the opening via a seal material, sealing performance of the inside of the enclosing structure is not damaged, and the luminous flux can be guided to the optical modulation device.

In addition, an incident-side polarizer constituting the optical modulation device is put on the transparent plate. In this way, since the incident-side polarizer is put on the transparent plate, the number of components of the optical modulation device to be attached to the side surface of the color-synthesizing optical system can be reduced, and a mounting structure of the optical modulation device to the color-synthesizing optical system can be simplified.

Furthermore, the projector may preferably include a driving circuit board for driving the optical modulation device, and an electric wiring member for electrically connecting the driving circuit board and the optical modulation device, and a wire insertion hole for inserting thereinto the electric wire member is formed in the first cover member. Since the wire insertion hole is formed in the first cover member, the driving circuit portion of the optical modulation device can be disposed outside the enclosing structure, whereby the enclosing structure can be reduced in size and the projector can be reduced in size.

The first cover member may preferably include a cutout formed by partially cutting out an end of the first side plate; and an engaging part formed on the second side plate and engaging the cutout, and the wire insertion hole is formed as a clearance between the cutout and the engaging part. In such a case, the wire insertion hole may preferably be formed as a clearance between the cutout and the engaging part so as to clamp the electric wiring member by the cutout and engaging part. That is, since the wire insertion hole is formed as a clearance between the cutout and the engaging part, the electric wiring member and the optical modulation device can be taken out of the enclosing structure by removing the engaged portion of the first side plate and the second side plate of the first cover member, whereby maintenance of the optical modulation device and the like can be facilitated.

In addition, the projector may preferably be provided with an elastic packing for sealing the wire insertion hole. In this way, since wire insertion hole in the projector is sealed by the elastic packing, cooling air flowing outside the device does not flow to the inside of the enclosing structure via the wire insertion hole, and air inside the enclosing structure can be always maintained in a clean state.

Furthermore, the electric wiring member may preferably be composed of a flexible wiring board, and a slit for inserting thereinto the flexible wiring board may preferably be formed in the elastic packing. In this way, since the elastic packing is formed in this way, an FPC can be passed through only by forming notches and the like in the rubber packing or the like, whereby the enclosing structure can be simplified.

The above-described aspects can be suitably combined as long as they are consistent with each other, and such combinations can simultaneously provide the action and effect of each of the aspect.

DETAILED DESCRIPTION OF PREFERRED EMBODIMENTS

Figure 1:
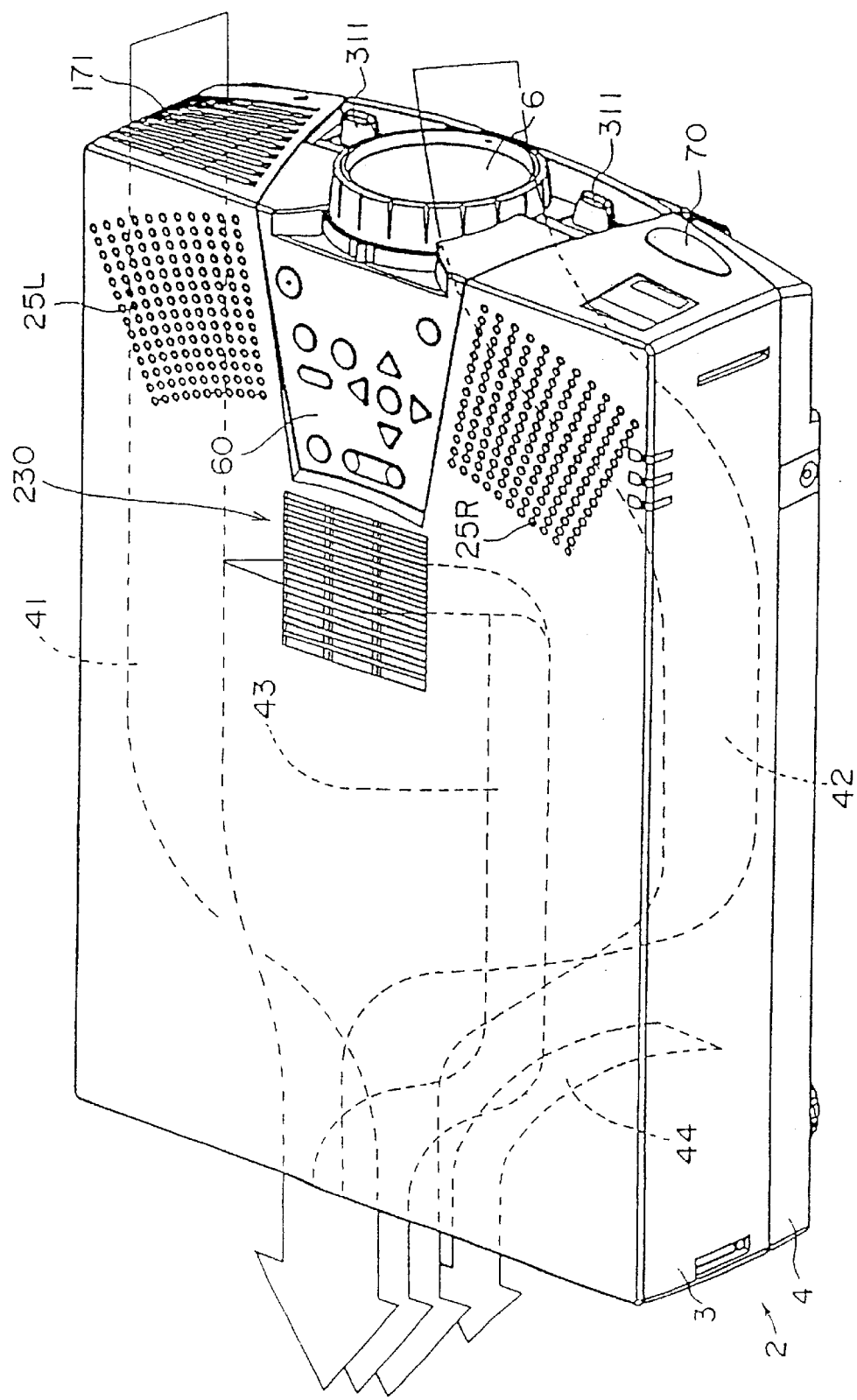
FIG. 1 is an outward perspective view of a projector according to a first embodiment of the present invention, as viewed from the top side.
Figure 2:
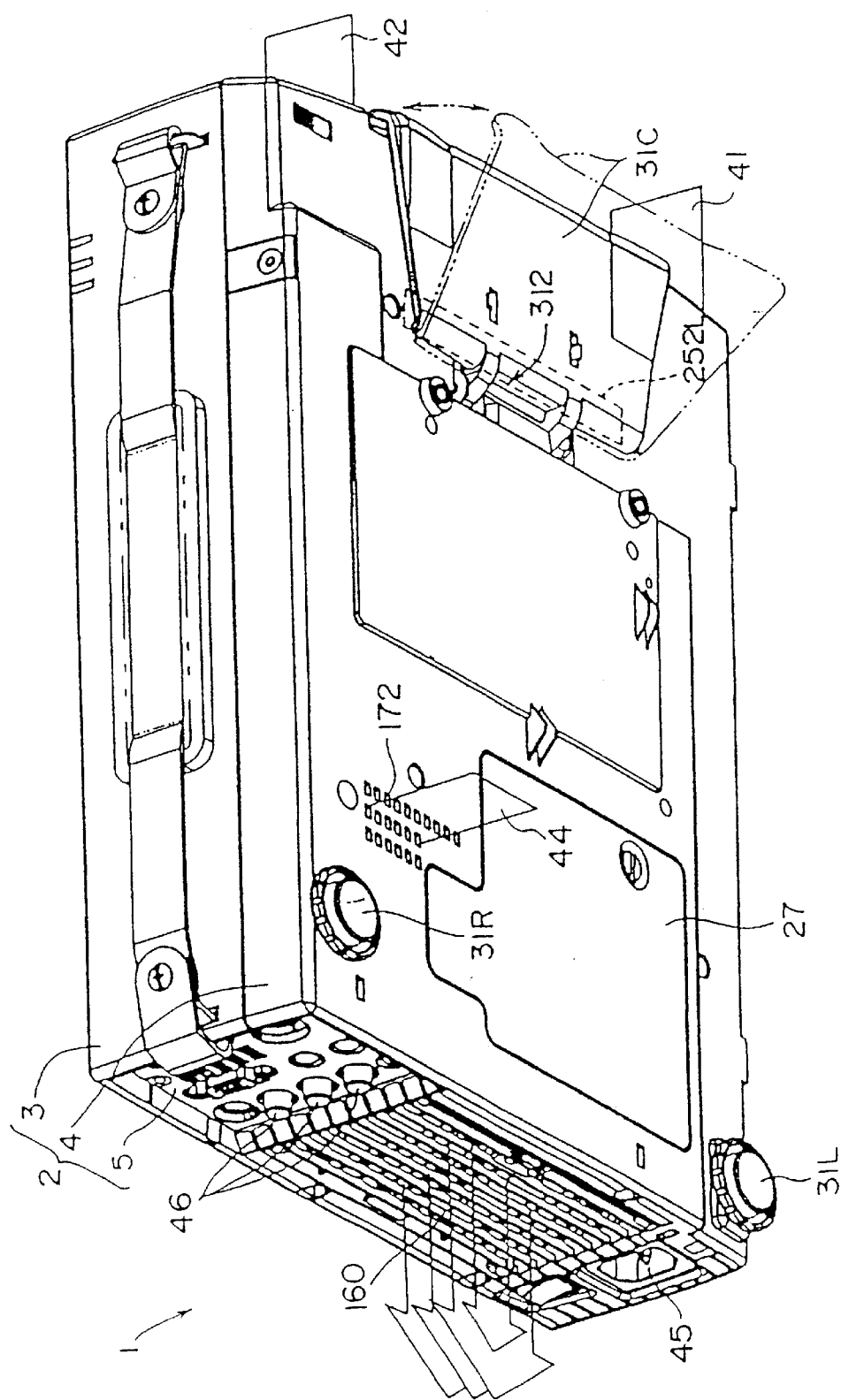
FIG. 2 is an outward perspective view of a projector in the embodiment, as viewed from the bottom side.

The first embodiment of the present invention will be described with reference to the drawings. FIGS. 1 and 2 are schematic perspective views of a projector 1 according to this embodiment. FIG. 1 is a perspective view as viewed from the top side, and FIG. 2 is a perspective view as viewed from the bottom side.

The projector 1 is of a type that separates a luminous flux emitted from a light source lamp into three primary colors of red (R), green (G) and blue (B), modulates these color luminous fluxes according to image information through liquid crystal panels constituting an optical modulation device, synthesizes the modulated luminous fluxes of respective colors by a prism (color-synthesizing optical system), and enlarges and displays the synthesized luminous flux onto a projection plane via a projection lens 6. Components are accommodated in an outer casing 2 except a part of the projection lens 6.

The outer casing 2 basically consists of an upper casing 3 for covering the top face of the device, a lower casing 4 constituting the bottom surface of the device, and a rear casing 5 (FIG. 2) for covering a rear face.

As shown in FIG. 1, many communication holes 25R and 25L are formed at left and right ends of the front side (projection lens side) of the top face of the upper casing 3. A control switch 60 for adjusting image quality of the projector 1 is provided between the communication holes 25R and 25L. Furthermore, an air inlet 230 for introducing cooling air into the projector 1 from the outside is provided on the side of the operation switch 60 adjacent to the rear end of the device. While it is not shown in FIG. 1, an air filter made of sponge is provided on the inner surface of the air inlet 230 to prevent dust from entering. A light-receiving section 70 is provided at the lower left portion of the front of the upper casing 3 so as to receive an optical signal from a remote controller that is not shown in the figure.

As shown in FIG. 2, a lamp-exchanging cover 27 for exchanging a light source lamp unit 8 (described below) is provided on the bottom surface of the lower casing 4, and a foot 31C is provided at substantially the front end center of the projector 1, and feet 31R and 31L are provided at the left and right rear end corners. The foot 31C is rotated by a rear end rotating mechanism 312 (FIG. 2) by raising levers 311 shown in FIG. 1, and is urged into an open state in which it is separated on its front end from the main body of the device, as shown by a two-dot chain line in FIG. 2. By controlling the amount of rotation, the vertical position of the display screen on the projection plane can be changed. On the other hand, the feet 31R and 31L are extended or retracted in the direction of projection by being rotated, and the inclination of the display screen can be changed by controlling the amount of extension or retraction thereof.

As shown in FIG. 2, the rear casing 5 has an AC inlet 45 for supplying external electric power and various input-output terminals 46 disposed thereon, and an air outlet 160 for exhausting air inside the device is formed adjacent to the input-output terminals 46.

Figure 3:
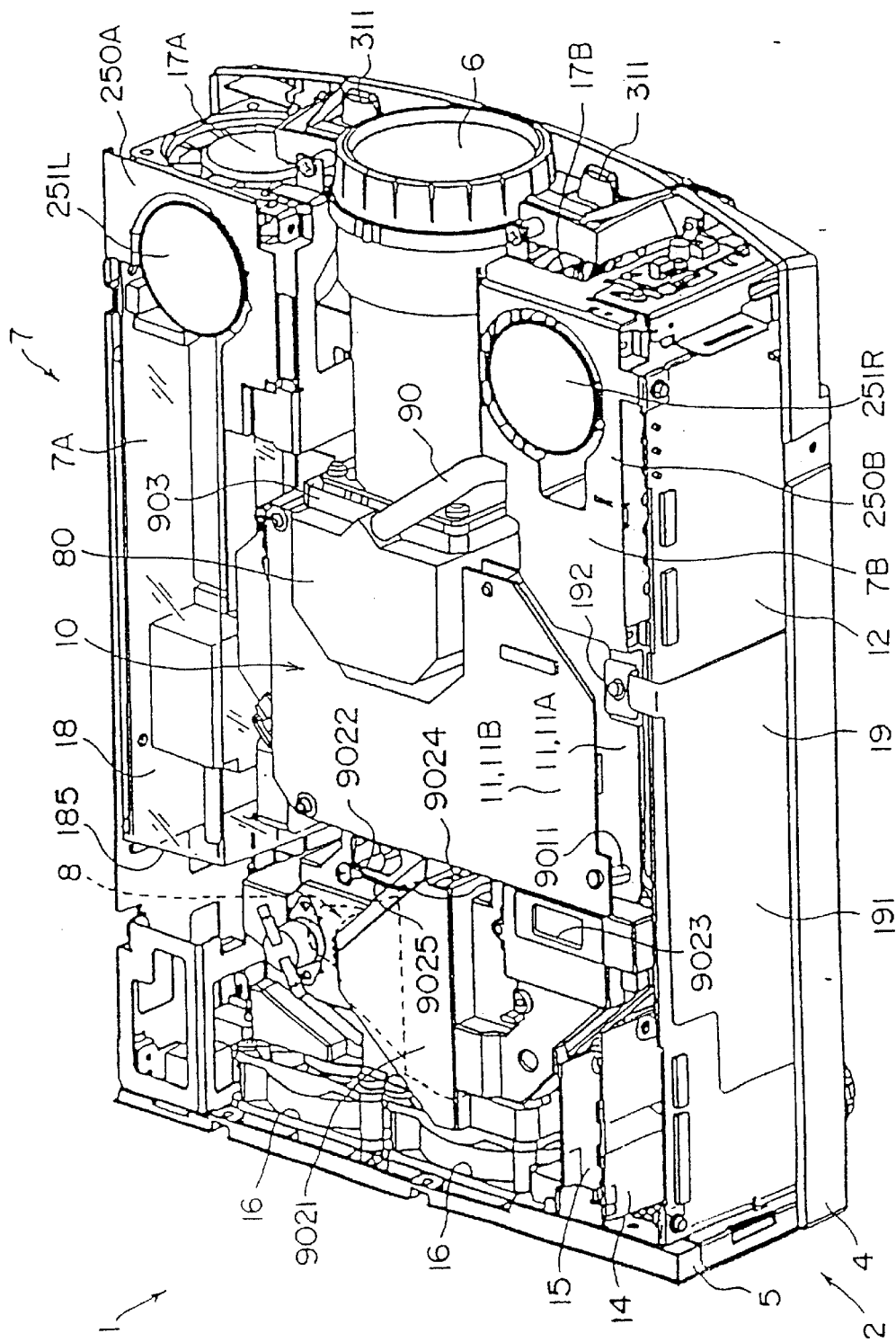
FIG. 3 is a perspective view showing the internal structure of the projector in the embodiment.
Figure 4:
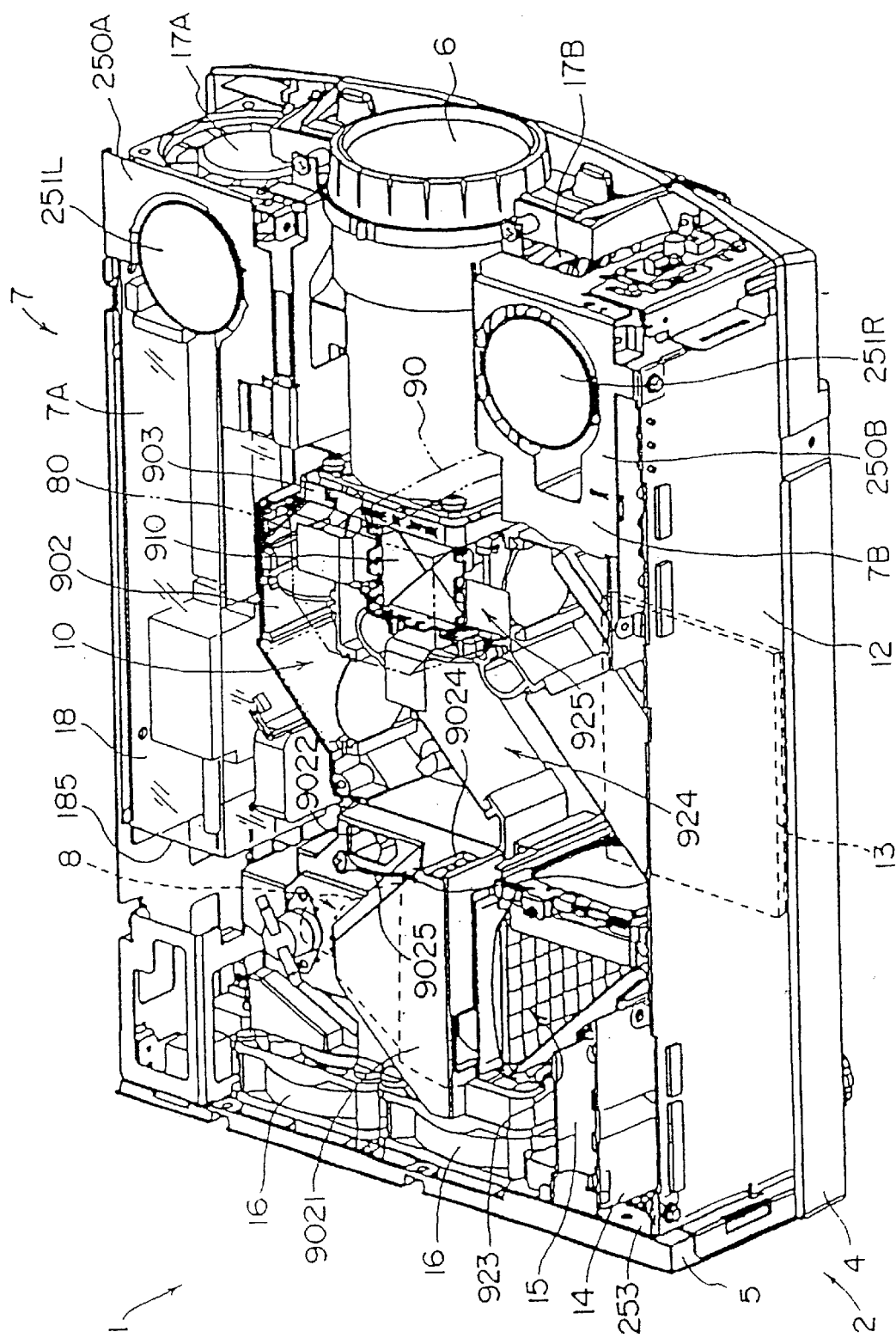
FIG. 4 is a perspective view showing an optical system inside the projector in the embodiment.

FIGS. 3 and 4 show the internal structure of the projector 1. As shown in these figures, a power supply unit 7 serving as a power supply, a light source lamp unit 8, an optical unit 10 constituting an optical system, a pair of upper and lower driver boards 11 serving as optical modulation device-driving board, and a main board 12 serving as a control circuit board are disposed inside the outer casing 2.

The power supply unit 7 consists of first and second power supply blocks 7A and 7B disposed on both sides of the projection lens 6. The first power supply block 7A transforms electric power obtained through the AC inlet 45 to supply mainly to the second power supply block 7B and the light source lamp unit 8, and includes a lamp-driving board 18 for driving a light source lamp 181 to be described below of the light source lamp unit 8, in addition to a power-supply circuit board having a transformer, a rectifying circuit, a smoothing circuit, and a voltage stabilizing circuit, etc. formed thereon. This lamp-driving board 18 is covered with a transparent resin cover 185. The second power supply block 7B further transforms and supplies the electric power obtained from the first power supply block 7A, and includes a power-supply circuit board having various circuits formed thereon, similarly to the first power supply block 7A. The electric power is supplied to another power-supply circuit board 13 (shown by a dotted line in FIG. 4) disposed below the optical unit 10, and to first and second intake fans 17A and 17B disposed adjacent to the power supply blocks 7A and 7B, respectively.

In addition, a power supply circuit on the power-supply circuit board 13 produces electric power mainly for driving a control circuit on the main board 12 based on the electric power from the second power supply block 7B, and produces electric power for other low power components. The second intake fan 17B is disposed between the second power supply block 7B and the projection lens 6 so as to draw cooling air from the outside into the inside through a clearance formed between the projection lens 6 and the upper casing 3 (FIG. 1). The power supply blocks 7A and 7B include conductive power supply-covering members 250A and 250B made of, for example, aluminum respectively, and the power supply-covering members 250A and 250B are provided with speakers 251R and 251L at positions corresponding to the communicating holes 25R and 25L of the upper casing 3, respectively. These power supply-covering members 250A and 250B are electrically connected to each other by a metal plate 252L at the bottom, as shown by a dotted line in FIG. 2, and are finally grounded via a GND (ground) line of the inlet 45. The metal plate 252L is fixed to the lower casing 4 made of resin in advance, and both ends thereof contact the bottom faces of the power supply-covering members 250A and 250B to be conducted to each other by assembling the power supply blocks 7A and 7B to the lower casing 4.

The light source lamp unit 8 constitutes a light source portion of the projector 1, and includes a light source device consisting of a light source lamp and a reflector, and a lamp housing for accommodating therein the light source device. The light source lamp unit 8 is covered with an accommodating section 9021 that is integrally formed with a lower light guide 902 shown in FIG. 4 so as to be removed from the above-described lamp-exchanging cover 27. A pair of exhaust fans 16 are provided at the back of the accommodating section 9021 on the left and right sides at positions corresponding to the air outlet 160 of the rear casing 5. As described hereinbelow in detail, cooling air drawn by first to third intake fans 17A to 17C is introduced by the exhaust fans 16 into the accommodating section 9021 from an opening provided in the vicinity thereof, the light source lamp unit 8 is cooled by the cooling air, and then the cooling air is exhausted from the air outlet 160. Electric power of each exhaust fan 16 is supplied from the power-supply circuit board 13.

The optical unit 10 is a unit for optically processing a luminous flux emitted from the light source lamp unit 8 to form an optical image corresponding to the image information, and includes an illuminating optical system 923, a color separation optical system 924, an optical modulation device 925, and a prism unit 910 serving as a color-synthesizing optical system, as shown in FIG. 4. The optical elements, such as lenses and mirrors, constituting the illuminating optical system 923 and the color separation optical system 924 are vertically held between an upper and a lower light guide, which are housing for optical components (only a lower light guide 902 is shown in FIG. 4). The upper light guide and the lower light guide 902 are integrally formed, and are fixed by fixing screws on the side of the lower casing 4. While it is not shown in FIGS. 3 and 4, a clearance is provided between the lower surface of the lower light guide 902 and the inner bottom surface of the lower casing 4, and the clearance communicates with the air outlet 160.

The prism unit 910 is fixed by fixing screws to a head body 903, which is a structure, substantially L-shaped in cross section, and three liquid crystal panels constituting the optical modulation device 925 are fixed to the side surfaces of the prism unit 910 by means of fixing members. As described hereinbelow, the electro-optical apparatus including the optical modulation device 925 and the prism unit 910 is covered with an enclosed box 80 and a portion of the head body 903 for mounting thereto the projection lens 6, and an optical path form the optical modulation device 925 to the projection lens 6 is enclosed.

The driver board 11 drives and controls the above-described three liquid crystal panels constituting the optical modulation device 925, and is disposed above the optical unit 10. The lower driver board 11A and the upper drive board 11B are separated from each other via a stud bolt 9011, and many elements (not shown) for forming driving circuit and the like are mounted on their opposing surfaces. That is, the many elements are sufficiently cooled by the cooling air flowing between the upper and lower driver boards 11A and 11B.

The main board 12 has a control circuit formed thereof for controlling the entire projector 1, and is allowed to stand aside the optical unit 10. The main board 12 is electrically connected to an interface substrate 14 having the input-output terminals 46 formed thereon and a video substrate 15, in addition to the above-described driver board 11 and the operation switch 60, and is connected to the power-supply circuit board 13 via a connector and the like. The control circuit of the main board 12 is driven by electric power produced by the power supply circuit on the power-supply circuit board 13, that is, the electric power from the second power supply block 7B. The main board 12 is cooled by cooling air flowing from the second intake fan 17B through the second power supply block 7B.

Referring to FIG. 3, a guard member 19 made of metal, such as aluminum, is disposed between the main board 12 and the outer casing 2 (only the lower casing 4 and the rear casing 5 are shown in FIG. 3). The guard member 19 includes a large planar section 191 spreading between the top and bottom of the main board 12, is fixed at the upper side to the cover member 250B of the second power supply block 7B by a fixing screw 192, and is engaged with, for example, slit of the lower casing 4 at the lower end. Consequently, interference between the upper casing 3 (FIG. 1) and the main board 12 is prevented when the upper casing 3 is mounted to the lower casing 4, and the main board 12 is protected from external noise.

[4] Structure of the Optical System

Figure 5:
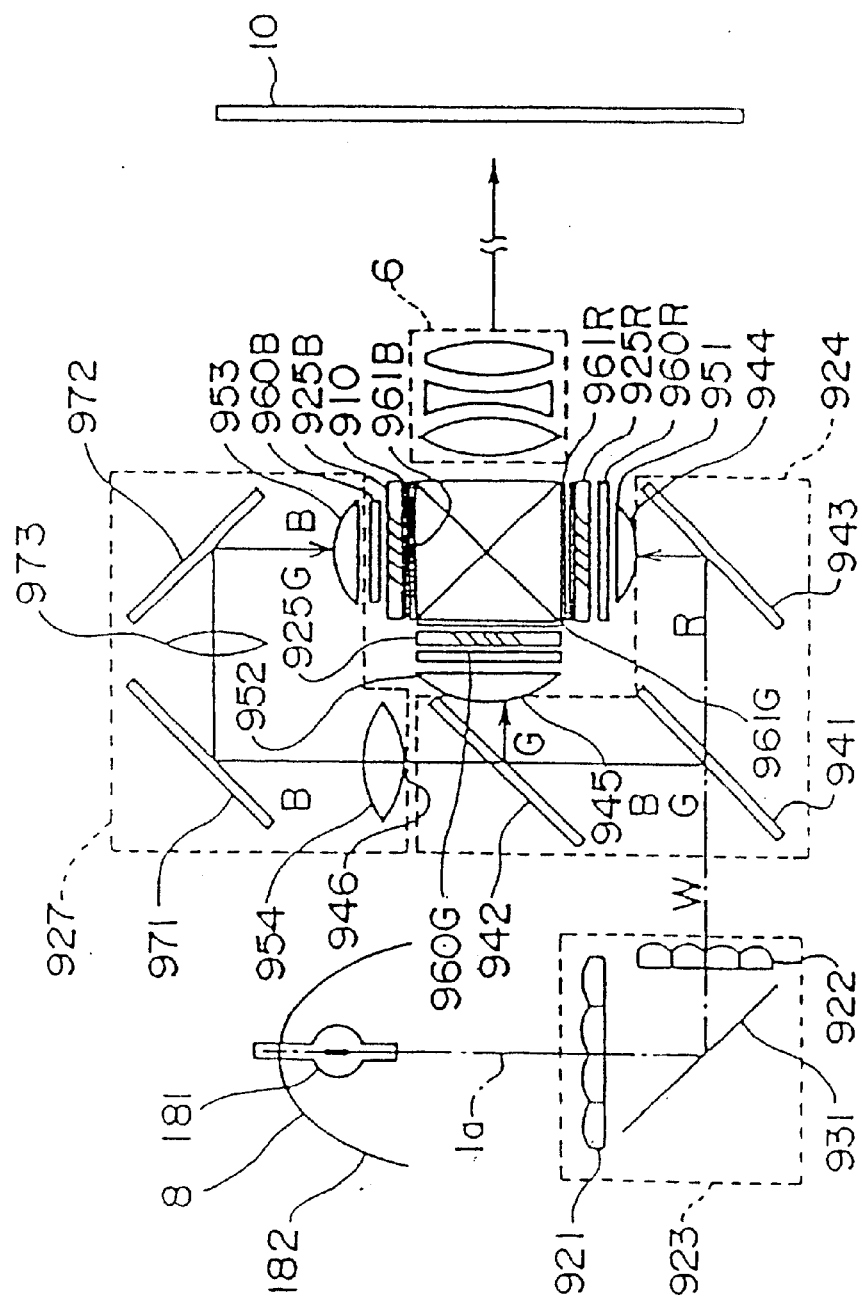
FIG. 5 is a schematic view for the explanation of a structure of the optical system in the embodiment.

The structure of the optical system, i.e., the optical unit 10 of the projector 1 will now be described with reference to a schematic view shown in FIG. 5.

As described above, the optical unit 10 includes the illuminating optical system 923 for producing a uniform in-plane illuminance distribution, the color separation optical system 924 for separating the luminous flux (W) from the illuminating optical system 923 into red (R), green (G), and blue (B) luminous fluxes, the optical modulation device 925 for modulating the color luminous fluxes R, G, and B according to the image information, and the prism unit 910 serving as a color-synthesizing optical system for synthesizing modulated color luminous fluxes. The light source lamp unit 8 includes a light source device consisting of a light source lamp 181 and a reflector 182.

The illuminating optical system 923 includes a reflecting mirror 931 for bending a central optical axis 1a of the luminous flux W emitted from the light source lamp unit 8 toward the front of the device, and a first lens plate 921 and a second lens plate 922 disposed on both sides of the reflecting mirror 931.

The first lens plate 921 has a plurality of rectangular lenses arranged in the form of a matrix, separates the luminous flux emitted from the light source into a plurality of partial luminous fluxes, and collects the partial luminous fluxes in the vicinity of the second lens plate 922.

The second lens plate 922 has a plurality of rectangular lenses arranged in the form of a matrix, and has the function of superimposing the partial luminous fluxes emitted from the first lens plate 921 onto the liquid crystal panels 925R, 925G, and 925B (to be described hereinbelow) constituting the optical modulation device 925.

In this way, according to the projector 1 of this embodiment, since the liquid crystal panels 925R, 925G, and 925B can be illuminated with light having a substantially uniform illuminance by the illuminating optical system 923, a projected image having no illuminance variations can be obtained.

The color separation optical system 924 is composed of a blue-green reflecting dichroic mirror 941, a green reflecting dichroic mirror 942, and a reflecting mirror 943. First, a blue luminous flux B and a green luminous flux G, included in the luminous flux W emitted from the illuminating optical system 923, are perpendicularly reflected by the blue-green reflecting dichroic mirror 941, and travel toward the green reflecting dichroic mirror 942.

The red luminous flux R passes through the blue-green reflecting dichroic mirror 941, is perpendicularly reflected by the reflecting mirror 943 located at the rear thereof, and is emitted toward the prism unit 910 from an emitting section 944 for a red luminous flux R. Then, only the green luminous flux G of the blue and green luminous fluxes B and G reflected by the blue-green reflecting dichroic mirror 941 is perpendicularly reflected by the green reflecting dichroic mirror 942, and is emitted from an emitting section 945 for the green luminous flux G toward the prism unit 910. The blue luminous flux B passing through the green reflecting dichroic mirror 942 is emitted from an emitting section 946 for the blue luminous flux B toward a relay optical system 927. In this embodiment, all the distances between the emitting section for the luminous flux W of the illuminating optical system 923 and the emitting sections 944, 945, 946 for the color luminous fluxes R, G, and B, respectively, of the color separation optical system 924 are set to be equal.

Condenser lenses 951 and 952 are disposed on the emitting sides of the emitting sections 944 and 945 for the red and green luminous fluxes R and G in the color separation optical system 924, respectively. Therefore, the red and green luminous fluxes R and G emitted from the emitting sections enter the condenser lenses 951 and 952, respectively, where they are collimated. The thus-collimated red and green luminous fluxes R and G pass through incident-side polarizers 960R and 960G, respectively, and enter the liquid crystal panels 925R and 925G, respectively, where they are modulated and given corresponding image information. That is, these liquid crystal panels 925R and 925G are subjected to switching control according to image information by the above-described driver board 11, whereby color light passing therethrough is modulated. On the other hand, the blue luminous flux B is guided to the corresponding liquid crystal panel 925B via the relay optical system 927, where it is similarly modulated according to image information. Liquid crystal panels using a polysilicon TFT as a switching element may be adopted as the liquid crystal panels 925R, 925G, and 925B of this embodiment.

The relay optical system 927 is composed of a condenser lens 954 disposed on the emitting side of the emitting section 946 of the blue luminous flux B, an incident-side reflecting mirror 971, an emitting-side reflecting mirror 972, an intermediate lens 973 disposed between these reflecting mirrors, and a condenser lens 953 disposed before the liquid crystal panel 925B. The blue luminous flux B emitted from the condenser lens 953 passes through the incident-side polarizer 960B to enter the liquid crystal panel 925B, where it is modulated. In this case, the central optical axis 1a of the luminous flux W, and the central optical axes 1r, 1g, and 1b of the color luminous fluxes R, G, and B are formed in the same plane. The blue luminous flux B has the longest optical path length in the color luminous fluxes, that is, the distance between the light source lamp 181 and the liquid crystal panel for the blue luminous flux B is the longest and hence, the amount of light of the blue luminous flux B to be lost is the largest. The light loss, however, can be restricted by interposing the relay optical system 927 therebetween.

Next, the color luminous fluxes modulated through the liquid crystal panels 925R, 925G, and 925B pass through emitting-side polarizers 961R, 961G, and 961B to be incident on the prism unit 910, where they are synthesized. That is, the prism unit 910 has a prism including two types of wavelength selective films arranged substantially in the shape of an X therein. The color luminous fluxes R, G, and B are synthesized because of selecting characteristics of the two types of wavelength selective films. A color image synthesized by the prism unit 910 is enlarged and projected via the projection lens 6 onto a projection plane 100 that is disposed at a predetermined position.

Figure 6:
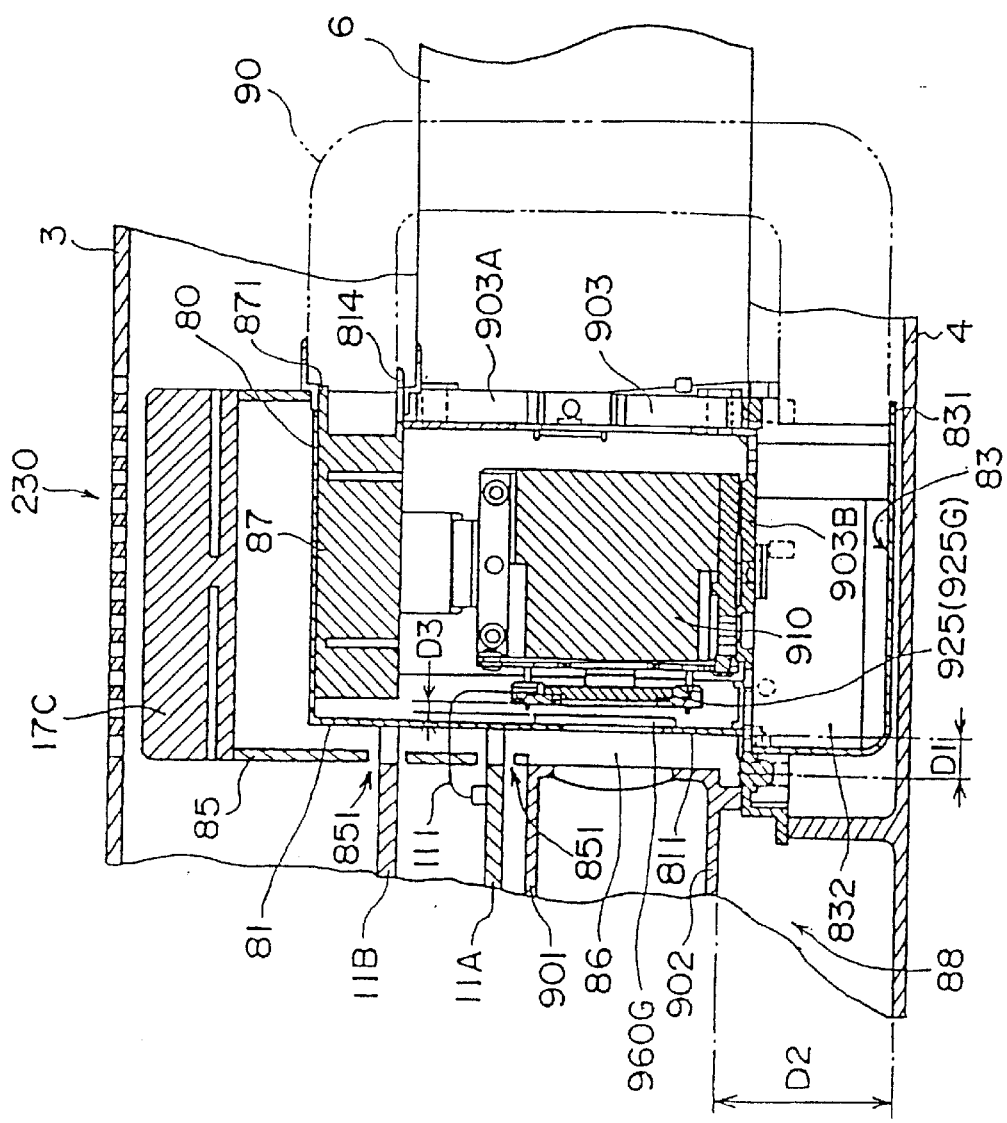
FIG. 6 is a vertical sectional view showing a structure of an enclosing structure in the embodiment.

The enclosed box 80 and a head body 903 are disposed adjacent to the light guide that is composed of the upper light guide 901 and the lower light guide 902, as shown in FIG. 6. In an enclosing structure divided by the enclosed box 80 and the head body 903, which is a structure, the electro-optical apparatus including the optical modulation device 925 and the prism unit 910 is accommodated in an enclosed state. In addition, the above-described air inlet 230 is formed in the upper surface of the upper casing 3 that corresponds to the plan position of the prism unit 910, and the intake fan 17C between the enclosed box 80 and the air inlet 230. Furthermore, a clearance of size D1 is formed in a boundary of the light guide and the enclosed box 80, and the clearance is a cooling-air introduction path 86. The cooling-air introduction path 86 communicates with an exhaust flow path 88 that is formed as a clearance of size D2 between the inner bottom surface of the lower casing 4 and the lower surface of the lower light guide 902. The planar shape of the enclosed box 80 is set smaller than a diameter of the intake fan 17C, whereby the cooling air from the intake fan 17C can easily flow in the cooling-air introduction path 86. The clearance size D1 of the cooling-air introduction path 86 is determined by a blast volume of the intake fan 17C and the volume of the enclosing structure. The size D1 may preferably be set at about 1 mm to 10 mm, and most preferably about 3 mm to 5 mm in consideration of accommodating efficiency of the projector 1. A cover member 85 is provided between the boundary of the upper light guide 901 and the intake fan 17C so as to surround the above-described cooling-air introduction path, and the cooling air drawn in from the air inlet 230 by the intake fan 17C is guided by the cover member 85 to the cooling-air introduction path 86. A cooling-air introducing opening 851 for partially introducing the cooling air is formed in a side surface of the cover member 85, and the cooling air partially introduced by the cooling-air introducing opening 851 is guided by the above-described driver board 11 to cool the driver board 11.

The head body 903, which is a structure, substantially L-shaped in cross section, is a member made of magnesium alloy, and a vertical portion of the substantially L shape is a projection-lens mounting portion 903A to which the projection lens 6 is fixed, and a horizontal portion of the substantially L shape is an electro-optical apparatus placing portion 903B onto which the electro-optical apparatus is placed and fixed. Although it is not shown in the figure, a flange directed toward the outside of the radial direction of the projection lens 6 is formed at the base end of the projection lens 6. The flange and the projection-lens mounting portion 903A are joined by fixing screws, and the projection lens 6 is mounted to the projection-lens mounting portion 903A. A seal material is provided between the projection-lens mounting portion 903A and the projection lens 6 to limit the circulation of air in the left and right spaces of the projection-lens mounting portion 903A shown in FIG. 6. Furthermore, a plurality of communicating holes are formed in the electro-optical apparatus placing portion 903B according to layout of the liquid crystal panels 925R, 925G, and 925B, whereby the circulation of air in upper and lower spaces divided by the electro-optical apparatus placing portion 903B is secured.

The enclosed box 80 is composed of an upper cover member 81 and a lower cover member 83 made of magnesium alloy. As shown in FIG. 6, a centrifugal fan 87 is provided below the upper surface of the upper cover member 81 to circulate air in the enclosing structure. The centrifugal fan 87 draws in air from the direction along the axis of rotation of the fan, and exhausts air in the direction tangential to the rotation of the fan. An air outlet 871 for exhausting air is connected to an air circulation path 90 via a connecting part 814 of the upper cover member 81, and a seal material is provided on each of connected portions to secure sealing performance. In this embodiment, a centrifugal fan having a maximum flow rate of 0.17 m³/min and a maximum static pressure at the air outlet 871 of 17.5 mmAq is used as the centrifugal fan 87. The air inside the enclosing structure is drawn in by the centrifugal fan 87, exhausted from the air circulation path 90, and supplied into the enclosing structure again by the lower cover member 83.

Figure 7:
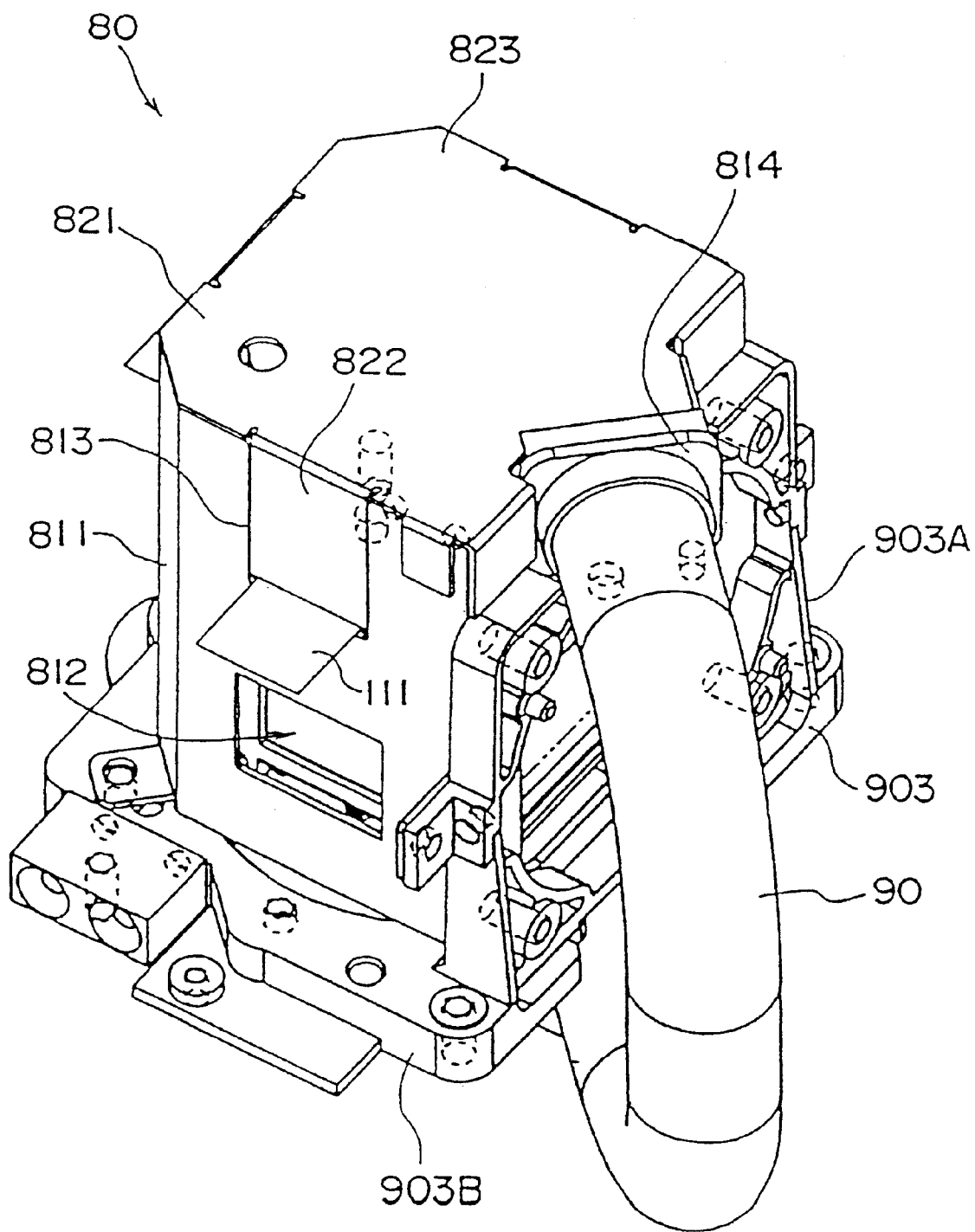
FIG. 7 is an outward perspective view of the enclosing structure in the embodiment.
Figure 8:
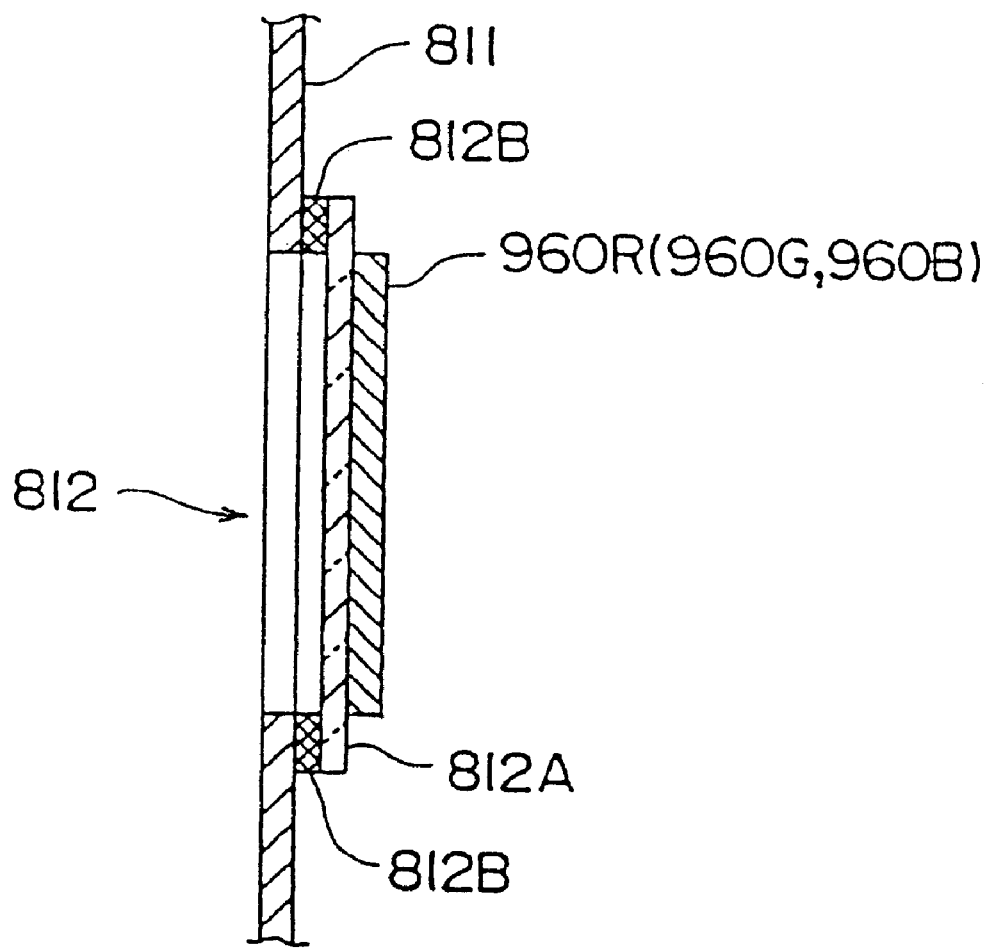
FIG. 8 is a vertical sectional view showing a structure of an opening formed in a first cover member in the embodiment.

As shown in FIG. 7, the upper cover member 81 is composed of a first side plate 811 that is disposed to enclose the liquid crystal panels 925R, 925G, and 925B (not shown in FIG. 7), and a second side plate 821 that covers the upper surface of the first side plate 811. Three openings 812 are formed in a portion of the first side plate 811 corresponding to the layout of the liquid crystal panels 925R, 925G, and 925B to introduce the red luminous flux R, the green luminous flux G, and the blue luminous flux B therefrom. As shown in FIG. 8, glass plates are put on each of the openings 812, and the above-described incident-side polarizers 960R, 960G, and 960B are attached to the inside thereof, respectively. Each of the glass plates is put on the first side plate 811 via a seal material, whereby the circulation of air in and out of the enclosing structure is shut off.

Figure 9:
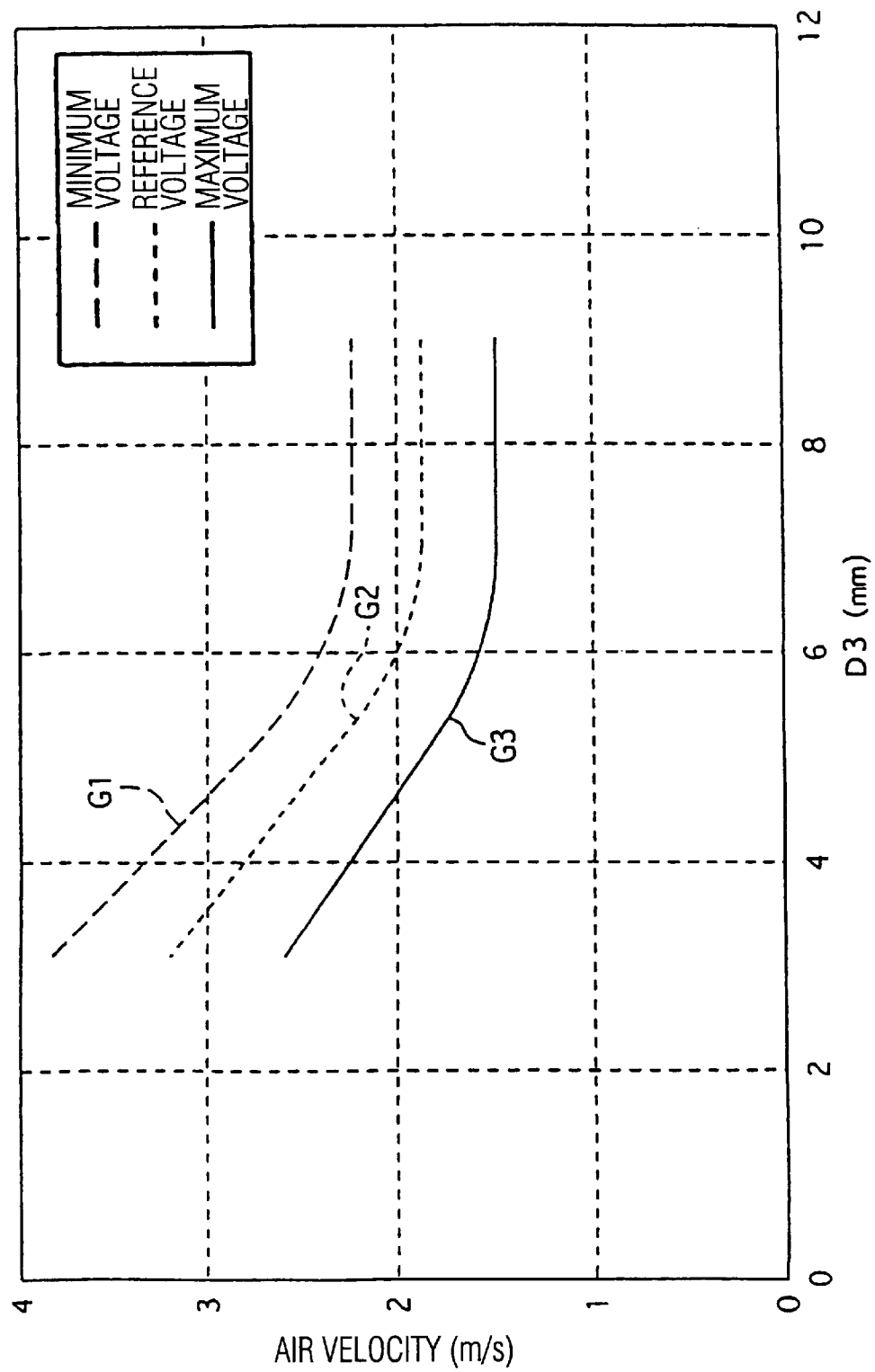
FIG. 9 is a graph showing the relationship between a clearance size of a clearance formed between the enclosing structure and an optical modulation device, and air velocity of air flowing in the clearance in the embodiment.

Furthermore, as shown in FIG. 6, a clearance is formed between the first side plate 811 and the liquid crystal panels 925R, 925G, and 925B, and the clearance size D3 is set to about 3 mm. This is because, as shown in FIG. 9, when the clearance size D3 is reduced, the air velocity of air flowing in the clearance increases, and the increased air velocity improves cooling efficiency of the liquid crystal panels 925R, 925G, and 925B. If this degree of clearance is formed between the enclosing structure and the optical modulation device, the air inside the enclosing structure can be suitably circulated along the clearance, thus making it possible to further efficiently cool the electro-optical apparatus. When the clearance size is set to 5 mm or more, the velocity of air flowing in the clearance decreases and the optical modulation device cannot be efficiently cooled, while setting the clearance size at 1 mm or less makes it difficult to manage layout accuracy of the side plates and the optical modulation device. Therefore, the clearance size may preferably be set at 1 mm to 5 mm. In this embodiment, the clearance size D3 is set to 3 mm because mounting tolerance of the first side plate 811 and the liquid crystal panels 925R, 925G, and 925B is considered. If they can be mounted with high accuracy, the clearance size D3 may be set to 3 mm or less. In FIG. 9, the graph G1 represents the variation in air velocity in the clearance when the centrifugal fan 87 is rotated by the maximum voltage, the graph G2 represents the variation in air velocity in the clearance when the centrifugal fan 87 is rotated by the reference voltage, and the graph G3 represents the variation in air velocity in the clearance when the centrifugal fan 87 is rotated by the minimum voltage.

Figure 10:
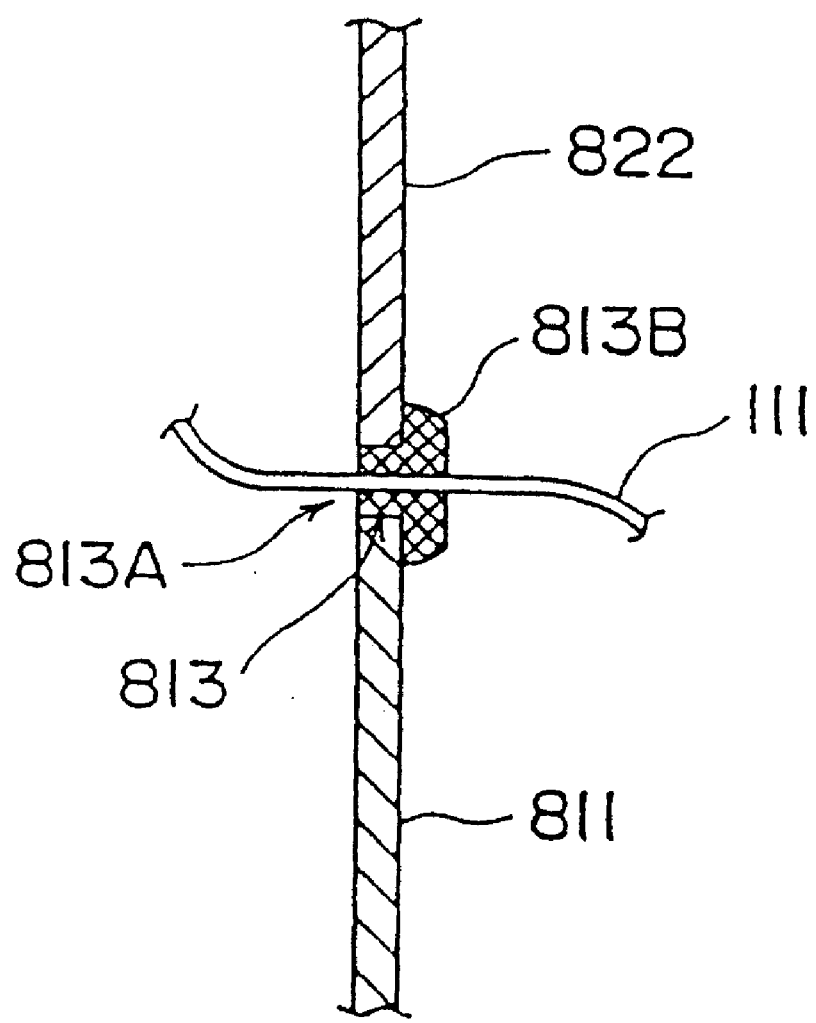
FIG. 10 is a vertical sectional view showing a wire insertion hole in the embodiment.

As shown in FIG. 7, cutouts 813 are formed above the three openings 812 in order to insert thereinto a flexible print cable (FPC) 111 for electrically connecting the liquid crystal panels 925R, 925G, and 925B and the driver board 11A. Furthermore, a connecting portion 814 for connecting the air circulation path 90 is formed on the upper front surface of the first side plate 811. The second side plate 821 includes a platelike portion 823 for covering the upper surface of the first side plate 811, and an engaging piece 822 provided at a position corresponding to the position of the cutout 813 of the first side plate 811 to engage the cutout 813. When the engaging piece 822 is inserted into the cutout 813, the FPC 111 is clamped between the engaging piece 822 and the first side plate 811. A rubber packing 813B is attached around the FPC 111, as shown in FIG. 10, to secure airtightness of the inside of the enclosing structure. While the first side plate 811 and the second side plate 821 of the upper cover member 81 are formed by separate members, they may be formed by a one-piece.

Figure 11:
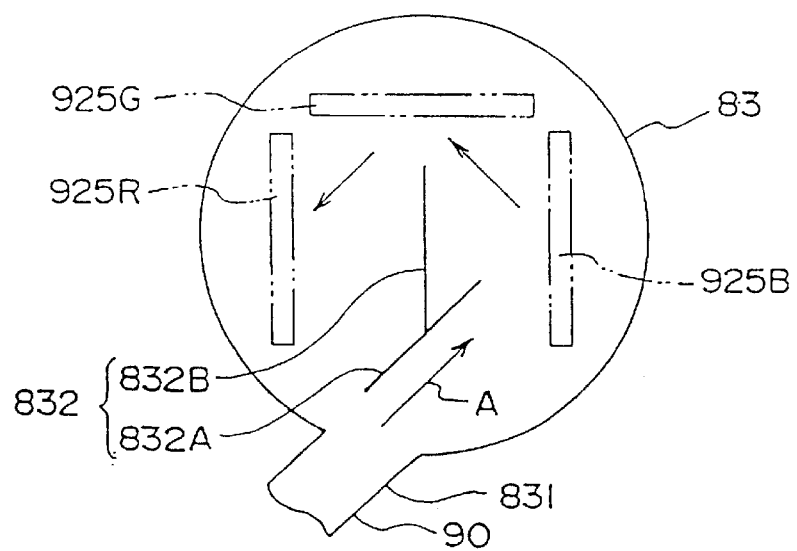
FIG. 11 is a plan view showing an internal structure of a lower cover member constituting the enclosing structure in the embodiment.

The lower cover member 83 is a cylindrical box-like member that covers the bottom of the head body 903, and a connecting portion 831 for connecting the air circulation path 90 is formed on the front side surface thereof, similarly to the upper cover member 81. A partition plate 832 is formed inside the lower cover member 83 so as to serve as a straightening plate for guiding air from the air circulation path 90. More specifically, as shown in FIG. 11, the layout of the partition plate 832 is determined by the direction of air emitted from the air circulation path 90, and the layout of the liquid crystal panels 925R, 925G, and 925B. In the case of this embodiment, the air A ejected from the air circulation path 90 is guided by the partition plate 832B to a lower portion of the liquid crystal panel 925B, and is subsequently guided by the partition plate 832B to lower portions of the liquid crystal panels 925G, and 925R.

Figure 12:
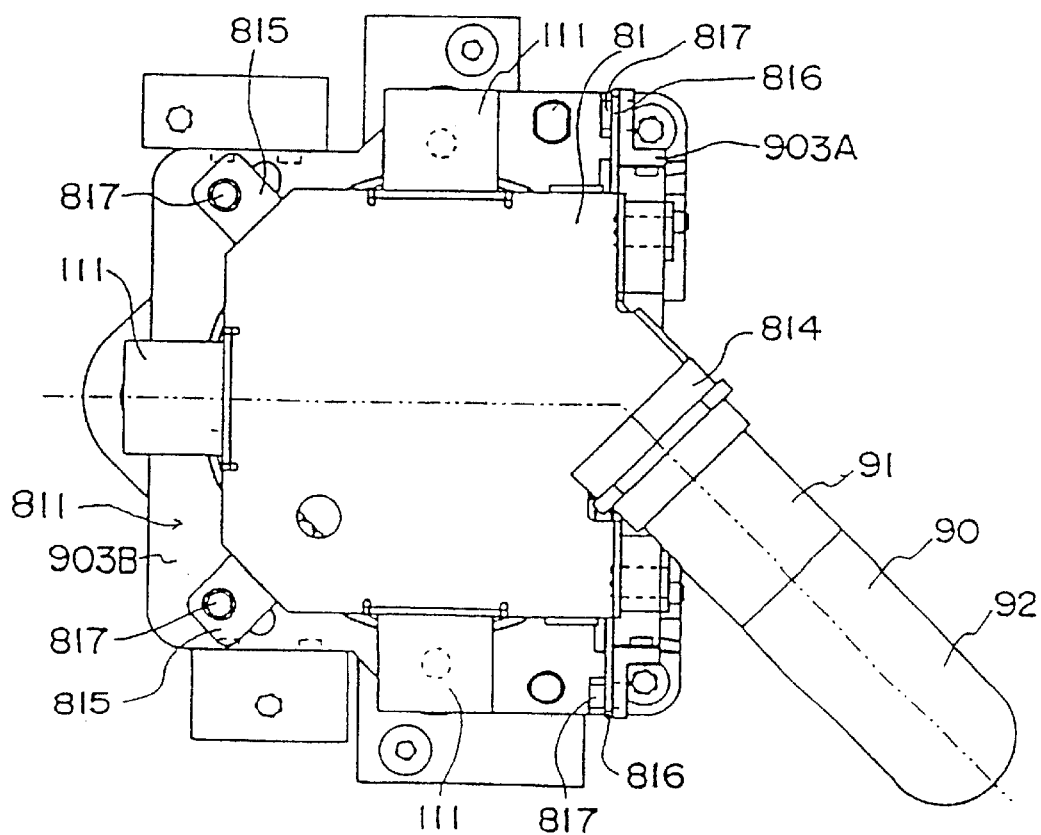
FIG. 12 is a plan view showing a mounting structure of an upper cover member constituting the enclosing structure in the embodiment.

The above-described upper cover member 81 and the lower cover member 83 are attached to the head body 903. The upper cover member 81 is attached to the side of the upper surface of the electro-optical apparatus placing portion 903B (on the side of the prism unit 910), and to a surface opposite to the projection-lens mounting portion 903A to which the projection lens 6 is mounted, and the lower cover member 83 is attached on the side of the lower surface of the electro-optical apparatus placing portion 903B (opposite side of the prism unit 910). The upper cover member 81 has a fixing piece 815 provided on the bottom of the first side plate 811, and a fixing piece 816 provided on the middle of the first side plate 811, as shown in FIG. 12, and these fixing pieces 815 and 816 are fixed to the electro-optical apparatus placing portion 903B and the projection-lens mounting portion 903A of the head body 903 by a bolt 817. Therefore, the planar shape of the upper cover member 81 is a rectangular shape such that a portion thereof to which the fixing piece 815 is provided is chamfered, thereby facilitating the screwing fixation of the bolt 817.

Figure 13:
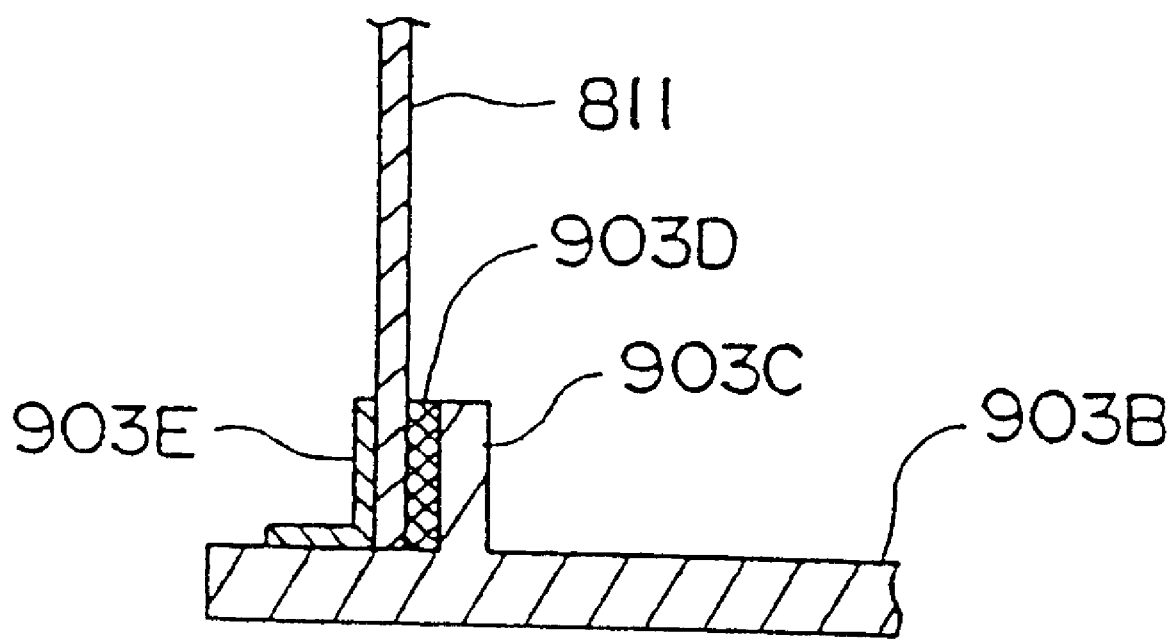
FIG. 13 is a vertical sectional view showing a mounting structure of the upper cover member constituting the enclosing structure in the embodiment.

As shown in FIG. 13, a rib 903C is formed on the upper surface of the electro-optical apparatus placing portion 903B in accordance with the layout of the first side plate 811 constituting the upper cover member 81. The rib 903C and the first side plate 811 are joined and fixed by a seal material 903D. Furthermore, an elongated member 903E, substantially L-shaped in cross section, is attached to the outer portion of the first side plate 811. A seal material, such as a rubber packing, is provided on a portion of the upper cover member 81 contacting the electro-optical apparatus placing portion 903B and the projection-lens mounting portion 903A, whereby sealing performance in and out of the upper cover member 81 is secured. Since a mounting structure of the lower cover member 83 to the head body 903 is substantially the same as the mounting structure of the upper cover member 81, a description thereof will be omitted.

The air circulation path 90 is composed of an aluminum pipe-like member 91 and an elbow 92, as shown in FIGS. 7 and 12, and ends thereof are connected to the connecting portion 814 of the upper cover member 81 and the connecting portion 831 of the lower cover member 83 via seal material.

The inside diameter of the pipe-like member 91 depends on how much the temperature of the three liquid crystal panels 925R, 925G, and 925B rises when the air in the enclosing structure is circulated by the centrifugal fan 87.

Figure 14:
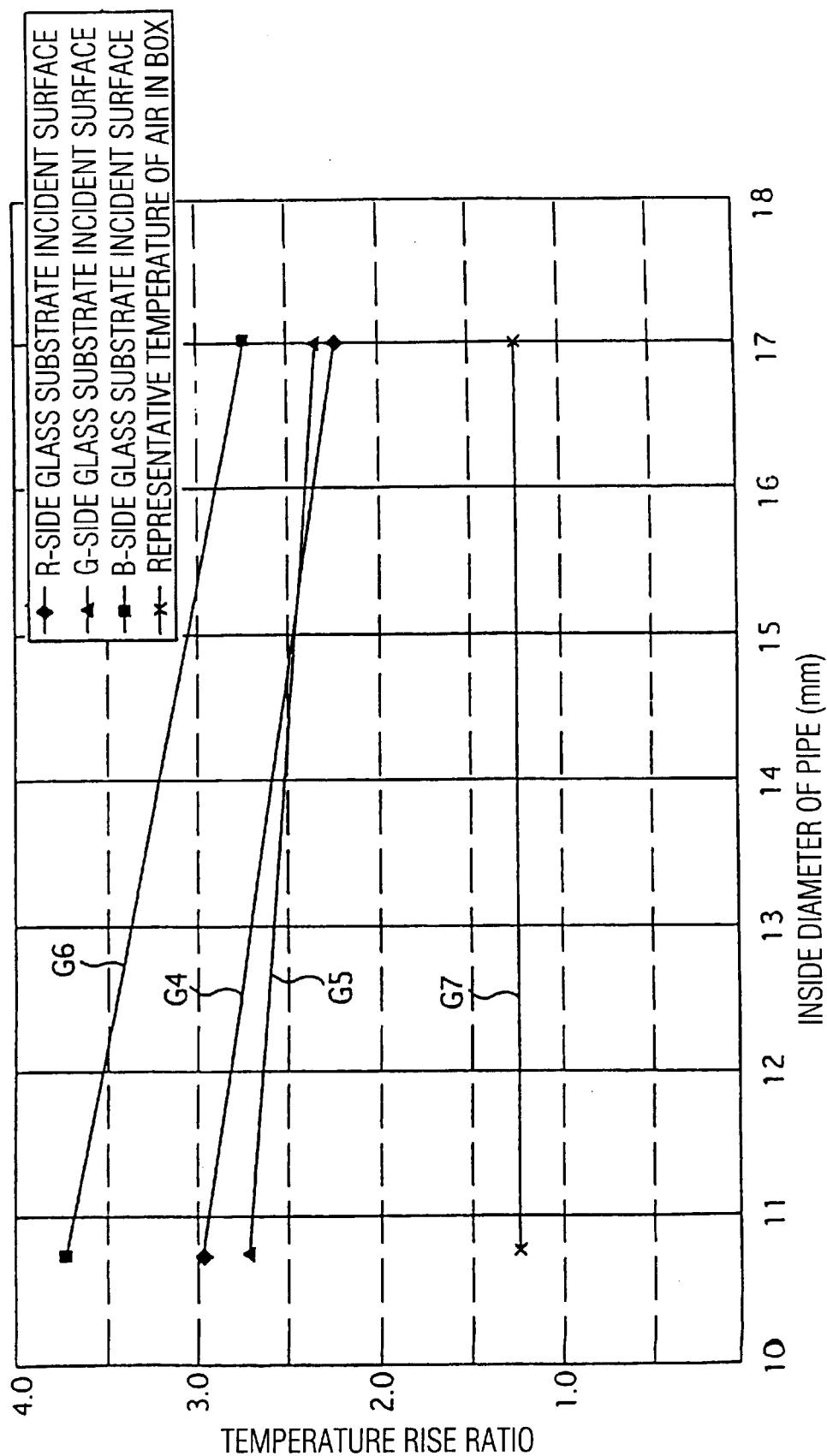
FIG. 14 is a graph showing the relationship between the inside diameter of a pipe-like member constituting an air circulation path and the temperature rise ratio of the optical modulation device inside an enclosed portion in the embodiment.

More specifically, an evaluation is made by a temperature rise rate with respect to the reference temperature when the inside diameter of the pipe-like member 91 is changed from 11 mm to 17 mm as shown in FIG. 4. In FIG. 14, the graph G4 represents the temperature rise ratio of the incident surface of the liquid crystal panel 925R, the graph G5 represents the temperature rise ratio of the incident surface of the liquid crystal panel 925G, the graph G6 represents the temperature rise ratio of the liquid crystal panel 925B, and the graph G7 represents the representative temperature of air inside the enclosed box 80.

As shown in FIG. 14, it will be understood that if the inside diameter of the pipe-like member 91 is increased, the temperature rise ratio of each of the liquid crystal panels 925R, 925G, and 925B can be reduced, that is, the liquid crystal panels 925R, 925G, and 925B can be efficiently cooled. However, when the inside diameter is set so as to be larger than the area of the air outlet 871 of the above-described centrifugal fan 87, a useless space is generated. Therefore, the inside diameter of the pipe-like member 91 may preferably be set according to an opening space of the air outlet 871, and may preferably be set at about 10 mm to 30 mm according to the specifications of the centrifugal fan 87. In the case of this embodiment, the inside diameter of the pipe-like member 91 is set at 17 mm in consideration of the opening space of the air outlet 871 of the centrifugal fan 87 of the above-described specifications. In addition, this embodiment is based on the premise that the length across corners of an image display portion of the liquid crystal panel is 0.9 in., and the capacity of the centrifugal fan to be used is increased or decreased with the increase or decrease in size of the display portion displaying an image, and the inside diameter of the pipe-like member 91 appropriate to the opening space of the air outlet 871 is increased or decreased with the increase or decrease in the capacity of the centrifugal fan.

Figure 15:
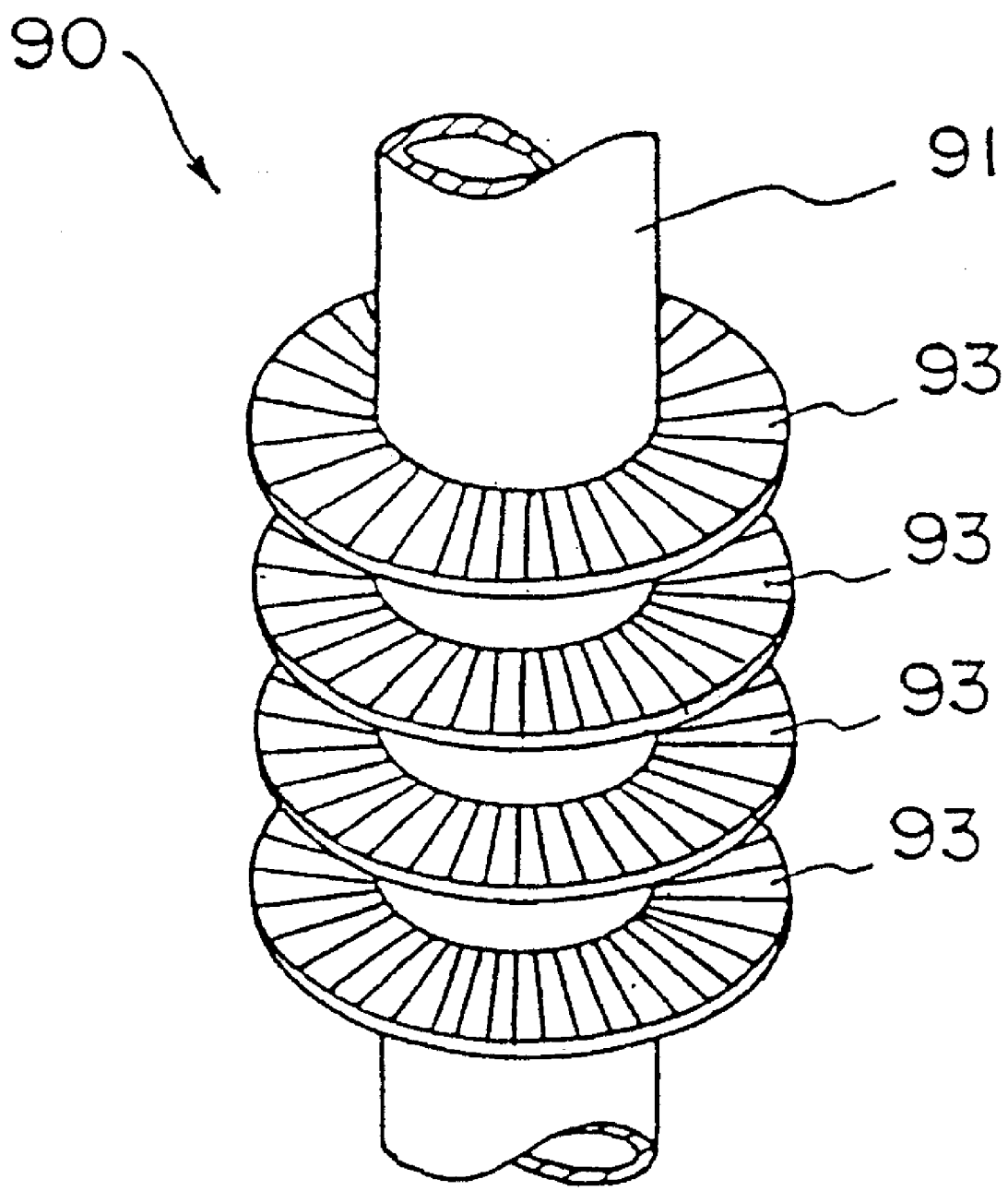
FIG. 15 is a perspective view showing a radiating structure provided in the air circulation path in the embodiment.

Although it is not shown in FIGS. 7 and 12, a radiating structure composed of a plurality of radiating fins 93 is provided on the outer periphery of the pipe-like member, as shown in FIG. 15. The radiating fins 93 are aluminum ring-shaped members joined to the outer peripheral surface of the air circulation path 90 by welding and the like. The number of the radiating fins 93 is suitably set according to cooling efficiency of air inside the air circulation path 90.

Next, a description will be given of cooling flow paths formed in the projector 1. In the projector 1, as is schematically shown by the arrows in FIGS. 1 and 2, there are mainly formed a first power block cooling flow path 41, a second power supply block cooling flow path 42, an optical modulation device cooling flow path 43, and a light source cooling flow path 44. However, cooling air circulating through the cooling flow paths 41 to 44 does not exactly flow along the arrows in the figures, and is drawn and exhausted nearly along the arrows through the spaces between the components.

The first power supply block cooling flow path 41 is a path for cooling air that is drawn from an air inlet 171 by the first intake fan 17A (FIGS. 3 and 4). The cooling air cools the first power supply block 7A, and then cools a lamp driving substrate 18 disposed at the rear thereof. In this case, the cooling air flows inside a resin cover 185 that is open at both front and rear ends, and the direction of the flow is thereby limited to one direction, which can reliably maintain a sufficient flow rate to cool the lamp driving substrate 18. Thereafter, the cooling air flows into the accommodating section 9021 from an opening 9022 provided at the top thereof, or another opening or space that is not shown, cools the light source lamp unit 8 (light source lamp 181), and is exhausted from the air outlet 160 by the exhaust fan 16.

The second power supply block cooling flow path 42 is a path for cooling air that is drawn by the second intake fan 17B, and the drawn cooling air first cools the air circulation path 90 disposed aside the projection lens 6, and then is supplied to the second power supply block 7B. The cooling air cools the second power supply block 7B, and then cools the main board 12 disposed at the rear thereof. Furthermore, the cooling air flows into the accommodating section 9021 from an opening 9023 adjacent thereto or the like, to cool the light source lamp unit 8, and is exhausted from the air outlet 160 by the exhaust fan 16.

The optical modulation device cooling flow path 43 is a path for cooling air that is drawn in by the third intake fan 17C shown in FIG. 6. The cooling air from the third intake fan 17C is supplied to the cooling air introduction path 86 via the cover member 85 to cool the entire enclosed box 80, and a part thereof flows into the cooling air-introducing opening 851 to cool the driver board 11 (11A and 11B). The cooling air that has cooled the enclosed box 80 reaches the bottom of the lower casing 4, passes through the above-described exhaust flow path 88 so as to be discharged to the outside from the air outlet 160 by the exhaust fan 16. On the other hand, the cooling air that has cooled the driver board 11 flows along the upper surface of the upper light guide 901 into the accommodating section 9021 through another opening 9024 in addition to the above-described openings 9022 and 9023 to cool the light source lamp 181, and then is similarly discharged from the air outlet 160. If an opening for allowing cooling air to flow toward the pipe-like member 91 is provided in a part of the cover member 85, and if an air flow path along the pipe-like member 91 is formed by the fan 17B, cooling efficiency for the enclosed box 80 can be further increased. In addition, when the fan 17C cannot be disposed because of the limited space, only the fan 17B can provide cooling having no problem from a practical viewpoint.

The light source cooling flow path 44 is a path for cooling air drawn in from an air inlet 172 (FIG. 2) on the lower surface of the lower casing 4. The cooling air is drawn in by the exhaust fans 16. After being drawn in from the air inlet 172, the cooling air flows into the accommodating section 9021 from an opening or space formed in the lower surface thereof to cool the light source lamp unit 8, and is exhausted from the air outlet 160.

The cooling air through the above-described cooling flow paths 41 to 44 is exhausted from the air outlet 160 by the exhaust fans 16. These exhaust fans 16 are controlled according to the temperatures of heated components. In other words, a temperature sensor 9025 covered with a shrink tube or the like is provided adjacent to the opening 9022 on the side of the light source lamp unit 8 that is apt to increase in temperature, and similar temperature sensors (not shown) are also provided adjacent to the second lens plate 922 (FIG. 4) below the opening 9023, and adjacent to the first and second power supply blocks 7A and 7B, and the liquid crystal panels 925R, 925G, and 925B. Electrical signals from these temperature sensors 9025 in the cooling flow paths 41 to 44 are, for example, output to the main board 12 via the power-supply circuit board 13 or the like. The main board 12 detects the temperature of the heated components or the cooling air by electrically processing these signals. As a result, the main board 12 executes control so as to perform positive cooling by simultaneously driving the exhaust fans 16 when it is determined that the temperature is high, or to save electric power by driving only one of the exhaust fans 16 when it is determined that the temperature is low.

Next, a description will be given of circulation and cooling the air inside the enclosing structure that is composed of the enclosed box 80 and the head body 903.

Air inside the enclosing structure is drawn up by the rotation of the centrifugal fan 87 to cool the liquid crystal panels 925R, 925G, and 925B constituting the optical modulation device 925. The air that has cooled the optical modulation device 925 is exhausted to the air circulation path 90 from the air outlet 871. Since the air circulation path 90 is cooled by cooling air flowing in the above-described second power supply block cooling flow path 42, the heat of the air that has cooled the optical modulation device 925 is absorbed by the air circulation path 90 during flowing in the air circulation path 90, and is cooled by heat exchange made between the air circulation path 90 and cooling air flowing outside thereof. Thereafter, the air flows to the lower portion of the liquid crystal panel 925B, the lower portion of the liquid crystal panel 925G, and the lower portion of the liquid crystal panel 925R in this order to cool these optical modulation devices 925 by the partition plate 832. Since the enclosed box 80 is also cooled by the cooling air from the third intake fan 17C, the heat of the air in the enclosing structure is absorbed by the enclosed box 80, and is cooled by heat exchange made between the enclosed box 80 and outside cooling air thereof.

The above-described embodiment provides the following advantages.

(1) Since the air circulation path 90 is disposed in a flow path of the second power supply block cooling flow path 42, air flowing in the air circulation path 90 is cooled through heat exchange between the air circulation path 90 and cooling air. The air cooled in the air circulation path 90 circulates inside the enclosing structure, whereby the optical modulation device 925 can be efficiently cooled.

(2) Since the centrifugal fan 87 serving as a circulating fan is provided inside the enclosing structure, the air inside the enclosing structure can be forcibly circulated through the air circulation path 90. Therefore, by making heat exchange between the air circulating inside the enclosing structure and the liquid crystal panels 925R, 925G, and 925B, the electro-optical apparatus including the liquid crystal panels 925R, 925G, and 925B can be efficiently cooled.

(3) Since the enclosing structure is constructed using the electro-optical apparatus placing portion 903B of the head body 903, the cost of manufacturing the projector 1 can be reduced, and the projector 1 can be easily reduced in size by simplifying members constituting the enclosing structure.

(4) Since the enclosed box 80 includes the upper cover member 81 and the second cover member 83, and the upper cover member 81 is composed of the first side plate 811 and the second side plate 821, the entire structure of the enclosed box 80 can be simplified by simplifying the structure of the cover members 81 and 83, whereby the enclosing structure can be reduced in size and the projector 1 can be reduced in size.

(5) Since the electro-optical apparatus is enclosed by the enclosing structure consisting of the head body 903 and the enclosed box 80, dust or the like does not adhere to the electro-optical apparatus, and the quality of image can be stably secured for a long period of time.

(6) Since the aluminum pipe-like member 91 has high heat-radiating performance, air inside the air circulation path can be further efficiently cooled if it is disposed in the second power supply block cooling flow path 42.

(7) Since the inside diameter of the pipe-like member 91 is set at 17 mm according to the centrifugal fan 87, the optical modulation device 925 can be efficiently cooled.

(8) Since the air circulation path 90 is detachable from the connecting portions 814 and 831 of the enclosing structure, maintenance of the optical modulation device 925 and the centrifugal fan 87, etc. inside the enclosed box 80 can be easily carried out.

(9) Since the air circulation path 90 and the connecting portions 814 and 831 are connected via the seal material, it is possible to securely prevent air leakage inside the enclosing structure.

(10) Since the enclosed box 80 made of magnesium alloy and the aluminum air circulation path 90 are connected via a seal material, such as rubber, electrolytic corrosion does not occur at a joint portion between two different metals, and sealing performance of the enclosed portion can be permanently secured.

(11) Since the air circulation path 90 includes a radiating structure composed of ring-shaped radiating fins 93, air inside the air circulation path 90 can be further efficiently cooled in the second power supply block cooling flow path 42.

(12) Since the air circulation path 90 is disposed aside the projection lens 6, a dead space aside the projection lens 6 can be effectively utilized, whereby the projector 1 can be advantageously reduced in size.

(13) Since the second intake fan 17B is provided in the vicinity of the air circulation path 90, the air circulation path 90 can be further efficiently cooled by the introduction of cooling air performed by the second intake fan 17B.

(14) Since the opening 812 for guiding a luminous flux to the liquid crystal panels 925R, 925G, and 925B constituting the optical modulation device 925 is formed, a luminous flux emitted from the light source lamp unit 8 and separated into color luminous fluxes R, G, and B by the color separation optical system 924 can be suitably modulated by the optical modulation device 925 and emitted from the projection lens 6, whereby the projector 1 can be positively operated.

(15) Since the glass plate 812A is attached to the opening 812 via the seal material 812B, sealing performance of the inside of the enclosed box 80 is not damaged, and the color luminous fluxes R, G, and B can be guided to the optical modulation device 925 by the transparent glass plate 812A.

(16) Since the incident-side polarizers 960R, 969G, and 960B constituting the optical modulation device 925 are bonded to the glass plate 812A by a bonding agent, the number of components of the optical modulation device 925 attached to the prism unit 910 can be reduced, and a mounting structure of the optical modulation device 925 to the prism unit 910 can be simplified.

(17) Since the wire insertion hole 813A is formed in the upper cover member 81, the driver board 11A for driving the optical modulation device 925 can be disposed outside the enclosed box 80, whereby the enclosed box 80 can be reduced in size and the projector 1 can be reduced in size.

(18) The wire insertion hole 813A is composed of the engaging piece 822 and the cutout 813. Therefore, by removing the engaged portion thereof, the FPC 111 and the liquid crystal panels 925R, 925G, and 925B can be taken out of the enclosed box 80, and maintenance of the optical modulation device 925 can be easily carried out.

(19) Since the wire insertion hole 813A is sealed by the elastic packing 813B, airtightness of the inside of the enclosed box 80 can be secured. In addition, by adopting the rubber elastic packing 813B, the FPC 111 can be passed through only by forming notches and the like, whereby the enclosing structure can be simplified.

(20) By adopting the centrifugal fan 87 as a forcible circulation device provided inside the enclosed box 80, high pressure of the air exhausted from the air outlet 871 can be obtained. Therefore, the air inside the enclosed box 80 can be securely circulated using the magnitude of the discharge pressure.

(21) Since the centrifugal fan 87 serving as a circulating fan is provided inside the enclosed box 80, the air inside the enclosed box 80 can be forcibly circulated through the air circulation path 90. Therefore, by making heat exchange between the air circulating inside the enclosed box 80 and the liquid crystal panels 925R, 925G, and 925B, the electro-optical apparatus including the liquid crystal panels 925R, 925G, and 925B can be efficiently cooled.

(22) Since the centrifugal fan 87 generates high discharge pressure as compared with a normal axial flow fan, noise produced by the rotation of the fan can be minimized by rotating the centrifugal fan 87 at low speed.

(23) Since the centrifugal fan 87 is disposed above the electro-optical apparatus, and an intake surface thereof opposes the electro-optical apparatus, the centrifugal fan 87 is disposed in air circulation flow on the drawing side, so that surfaces of the liquid crystal panels of the optical modulation device 925 constituting the electro-optical apparatus can be uniformly cooled.

(24) Since the pipe-like member 91 constituting the air circulation path 90 is connected to the centrifugal fan 87, the whole air that has cooled the electro-optical apparatus and drawn by the centrifugal fan 87 circulates in the pipe-like member 91. Therefore, since the air circulation path 90 is disposed in the second power supply block cooling flow path 42 and is cooled by cooling air flowing inside the projector, the air inside the enclosed box 80 can be efficiently cooled by heat exchange between the pipe-like member 91 and the air. By ejecting the cooled air from the connecting portion 831 of the other end of the air circulation path 90, the electro-optical apparatus can be cooled.

(25) Since the partition plate 832 serving as a straightening plate is provided inside the lower cover member 83, air ejected from the connecting portion 831 of the air circulation path 90 can be guided according to the layout of the liquid crystal panels 925R, 925G, and 925B, and the electro-optical apparatus can be further efficiently cooled. In particular, the partition plate 832 is constructed so as to guide air in the order of the liquid crystal panel 925B for modulating the blue luminous flux, the liquid crystal panel 925G for modulating the green luminous flux, and the liquid crystal panel 925R for modulating the red luminous flux. Therefore, the liquid crystal panels 925R, 925G, and 925B can be suitably cooled in the order of a large heating value.

(26) Since the clearance size D3 between the first side plate 811 of the enclosed box 80 and the liquid crystal panels 925R, 925G, and 925B is set at about 3 mm, the liquid crystal panels 925R, 925G, and 925B can be suitably cooled while sufficiently securing air velocity of air flowing in the clearance.

The second embodiment of the present invention will now be described. In the following embodiments and modification, the components that are the same as or similar to those of the first embodiment are indicated by the same reference numerals, and a description thereof will be omitted or simplified.

A projector in this embodiment differs from the projector 1 in the first embodiment in the following three points of 1, 2, and 3.

1. The enclosed box 80 according to the first embodiment has nothing provided on the outer periphery thereof, and cooling air introduced from the intake fan 17C flows around the enclosed box 80 to thereby cool the air inside the enclosed box 80.

Figure 16:
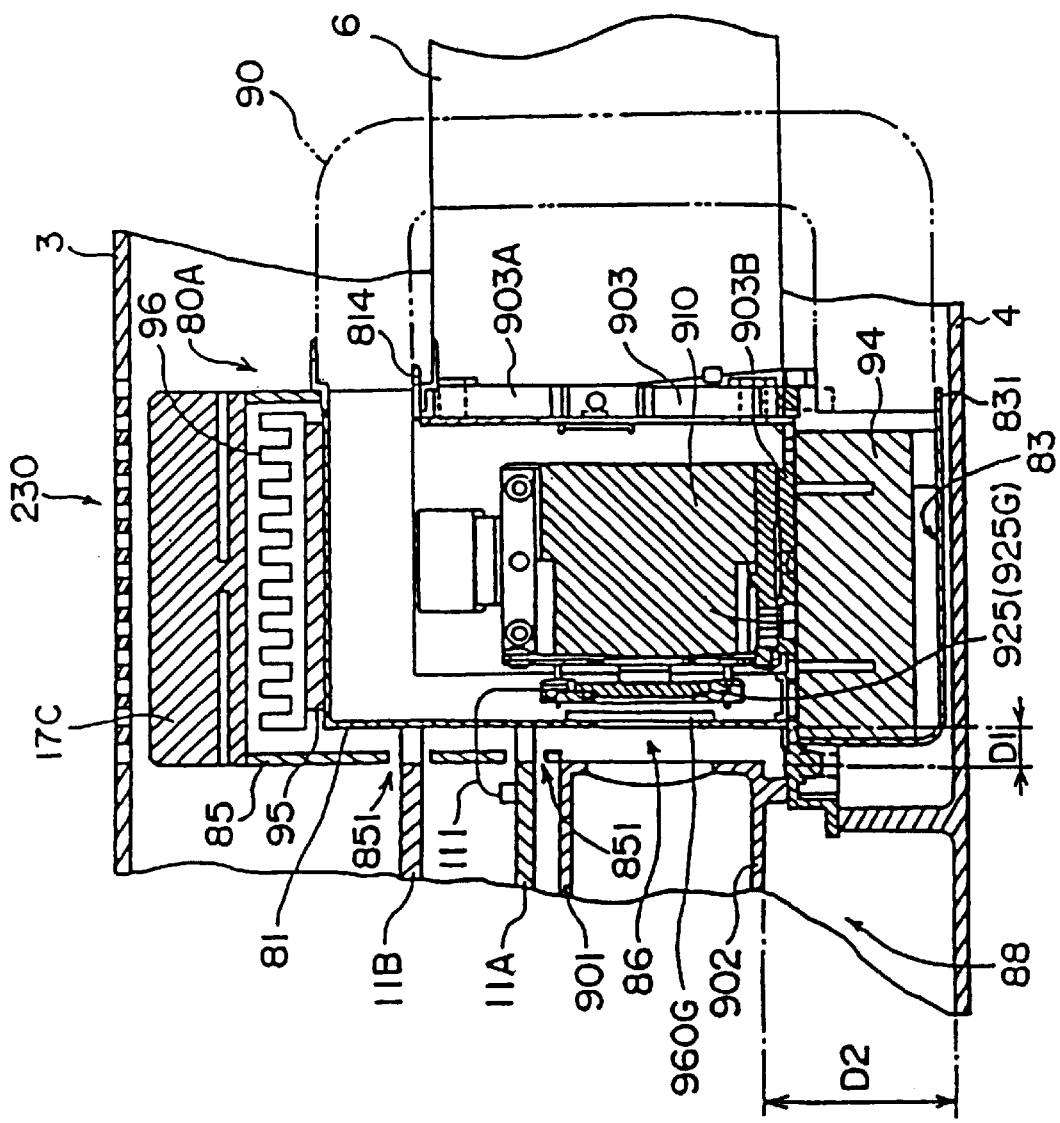
FIG. 16 is a vertical sectional view showing an enclosing structure in a second embodiment.
Figure 17:
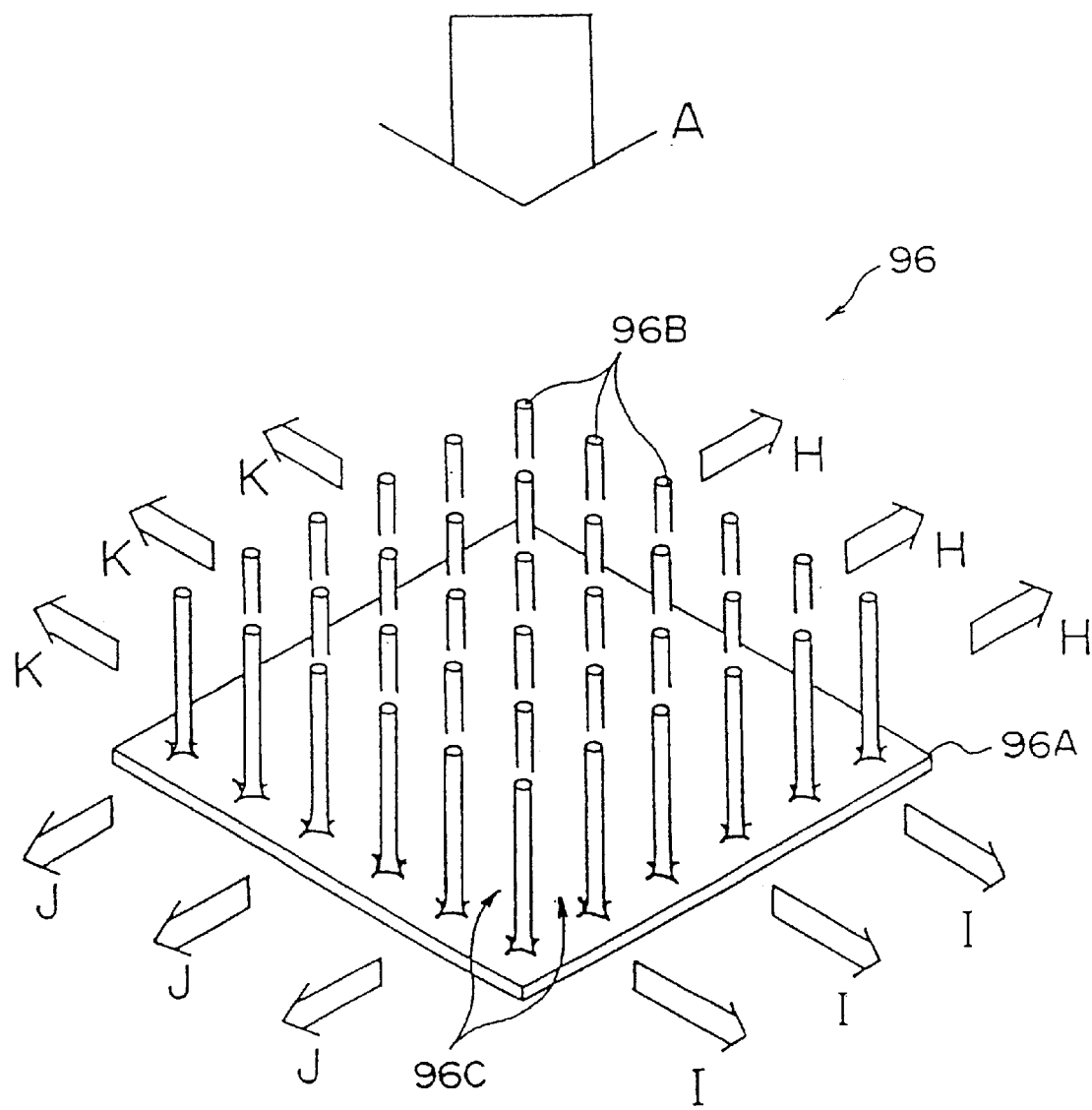
FIG. 17 is a perspective view showing a cooling fin provided on the upper surface of an enclosed box in the embodiment.

In contrast, in an enclosed box 80A of a projector according to this embodiment, a Peltier element 95 is provided on the upper surface of an upper cover member 81, and a cooling fin 96 is provided thereon, as shown in FIG. 16. The cooling fin 96 includes a metal base plate 96A, and a number of columnar projections 96B projected on the base plate 96A as shown in FIG. 17. These columnar projections 96B are aligned in the form of a grid on the base plate 96A, and valleys 96C each having a sufficient width for the circulation of air are formed in all directions between adjacent columnar projections 96B so that the cooling air from the intake fan 17C can flow out in random directions, such as the directions H, I, J, and K, after flowing downward from above in the direction of the arrow A to abut against the base plate 96A.

2. In the enclosed box 80 according to the first embodiment, the centrifugal fan 87 is provided below the upper surface of the upper cover member 81 to circulate air.

In contrast, in the enclosed box 80A according to the second embodiment, an axial flow fan 94 serving as a circulating fan is attached below the lower surface of an electro-optical apparatus placing portion 903B, and a clearance is formed between the bottom of the axial flow fan 94 and the bottom of the lower cover member 83, as shown in FIG. 16.

3. Furthermore, in the enclosed box 80 according to the first embodiment, the incident-side polarizers 960R, 960G, and 960B are attached to the inside of the three openings 812 formed in the first side plate 811 via the glass plate 812A and the seal material 812B, as shown in FIG. 8.

Figure 18:
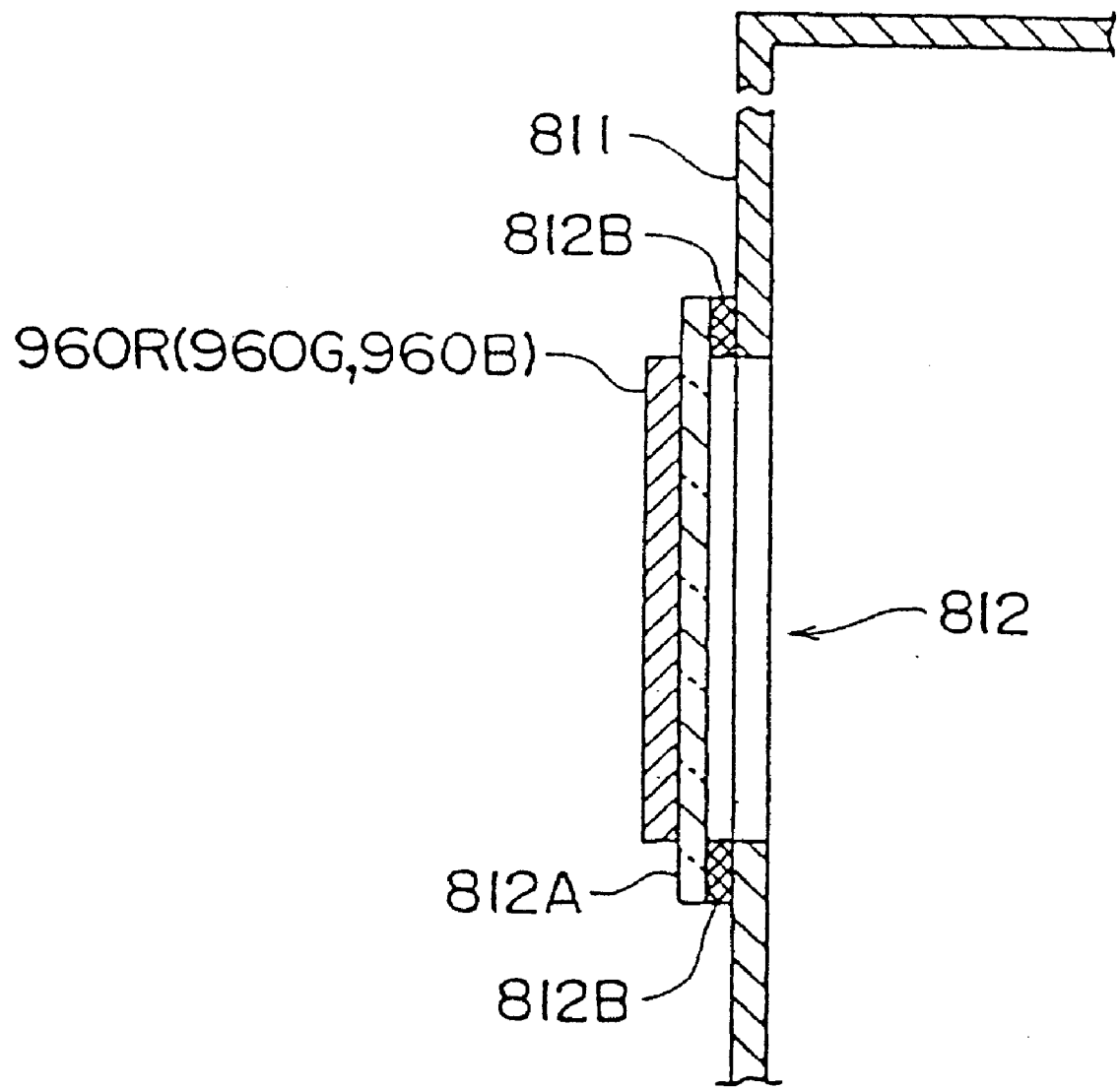
FIG. 18 is a vertical sectional view showing a cooling structure provided on a side surface of the enclosing structure in the embodiment.

In contrast, in the enclosed box 80A according to the second embodiment, incident-side polarizers 960R, 960G, and 960B are attached to the outside of a first side plate 811 via a glass plate 812A and a seal material 812B, as shown in FIG. 18.

With the described configuration, heat exchange by the medium of circulating air inside the enclosed box 80A will be sequentially made as described below.

1. First, air cooled through an air circulation path 90 passes through a clearance formed between the bottom of the axial flow fan 94 and the bottom surface of a lower cover member 83, and is ejected by the axial flow fan 94 toward the electro-optical apparatus.

2. The ejected air cools liquid crystal panels 925R, 925G, and 925B, and emitting-side polarizers 961R, 961G, and 961B that are the sources of heat generation, and the temperature of the air rises.

3. Thereafter, the temperature-elevated air contacts the upper surface of the upper cover member 81 that encloses the electro-optical apparatus to make heat exchange with an upper cover member 81, is then exhausted to the air circulation path 90 again through an air outlet 871 to make heat exchange with cooling air flowing outside thereof via radiating fins 93, and is further cooled.

4. Furthermore, the heat transmitted to the upper cover member 81 is quickly transmitted by the Peltier element 95 to the base plate 96A of the cooling fin 96.

5. Then, through a number of columnar projections 96B extending from the base plate 96A toward an air inlet 230, heat is radiated to the cooling air that is drawn by an intake fan 17C from the air inlet 230.

6. Finally, the cooling air cools the cooling fin 96 and then cools the incident-side polarizers 960R, 960G, and 960B while circulating on the valleys 96C among the columnar projections 96B in all directions, with the flow path for the cooling air divided toward three side surfaces of the enclosed box 80A on which the incident-side polarizers 960R, 960G, and 960B are provided.

According to the above-described second embodiment, the following advantages can be obtained in addition to the advantages obtained by the projector in the first embodiment.

(27) The heat accumulated in the enclosing structure is quickly drawn by the Peltier element 95 and is transmitted to the cooling fin 96. Moreover, since a number of columnar projections 96B are formed to be directed toward the air inlet 230, and the valleys 96C formed among the columnar projections 96B have sufficient width, the cooling air abutted against the base plate flows out in random directions, whereby the enclosed box 80A disposed below the cooling fin 96 can be uniformly cooled.

(28) Since the cooling air passing through the cooling fin 96 flows along the three side surfaces of the enclosed box 80A, the incident-side polarizers 960R, 960G, and 960B can be efficiently cooled.

(29) Since the incident-side polarizers 960R, 960G, and 960B are put on the outside of the enclosed box 80A, the volume of the enclosed box 80A can be reduced.

(30) The heat generated by the polarizers 960R, 960G, and 960B can be efficiently cooled by external air, and radiant heat to the liquid crystal panels 925R, 925G, and 925B can be minimized, thereby increasing cooling efficiency of the enclosed box 80A.

The third embodiment of the present invention will now be described with reference to the drawings.

Figure 19:
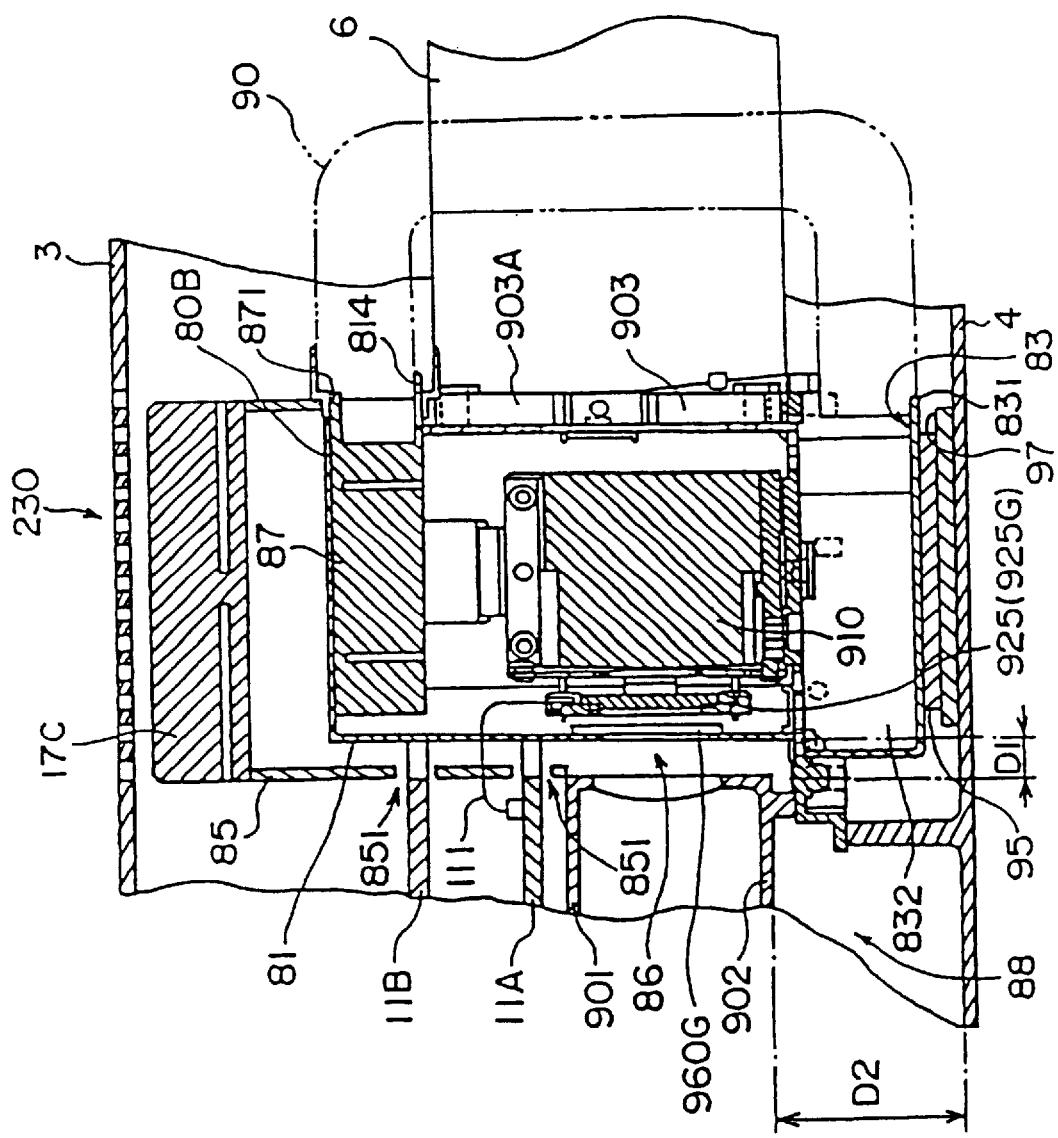
FIG. 19 is a vertical sectional view showing an enclosing structure in a third embodiment.

FIG. 19 shows an enclosed box 80B serving as an enclosing structure of a projector according to this embodiment.

In a cooling structure according to the second embodiment, the Peltier element 95 is provided on the upper surface of the upper cover member 81, and the cooling fin 96 is provided on the Peltier element 95.

In a cooling structure according to the third embodiment, a platelike Peltier element 95 having silicone-based bonding agent 97 attached to the lower surface thereof is clamped between a lower cover member 83 and a lower casing 4 as shown in FIG. 19. That is, the Peltier element 95 is provided on the lower surface of an enclosed box 80C, and is bonded and fixed to the inner peripheral surface of the lower casing 4 by the silicone-based bonding agent 97.

While the silicone-based bonding agent 97 has superior thermal stability, and shows good thermal conductivity, it is used as a member for filling a clearance between the lower cover member 83 and the lower casing 4 utilizing characteristics such that it shows superior affinity to other materials regardless of organic or inorganic material, and has superior adherence.

Furthermore, the lower cover member 83 made of magnesium alloy is used.

With the described configuration, the heat accumulated in the lower cover member 83 is discharged to the outside as described below.

1. First, the heat is absorbed by a Peltier element 95 having heat absorbing function, and is quickly transmitted to a lower casing 4 via the silicone-based bonding agent 97, so that the entire lower casing 4 has the function of a cooling fan.

2. Next, not only by the heat radiation with the lower casing 4, but also by the cooling air circulating in an optical modulation device cooling flow path 43, edges of the Peltier element 95 and the silicone-based bonding agent 97 are cooled, and the cooling air is exhausted to the outside from the air outlet 160.

According to the above-described third embodiment, the following new advantage can be obtained in addition to the advantages of the first embodiment.

(31) The centrifugal fan 87 is provided above the electro-optical apparatus, and the Peltier element 95 is fixed by the silicone-based bonding agent 97 between the lower cover member 83 and the metal lower casing 4. Therefore, the heat accumulated in the enclosed box 80 is securely and quickly transmitted to the lower casing 4 via the Peltier element 95, and the overall lower casing 4 has the function of cooling fin, whereby the enclosed box 80C can be efficiently cooled.

(32) Since the Peltier element 95 and the silicone-based bonding agent 97 are formed into a thin and planar shape, only a small space is required for providing a certain cooling mechanism, and the overall device can be easily reduced in size.

Figure 20:
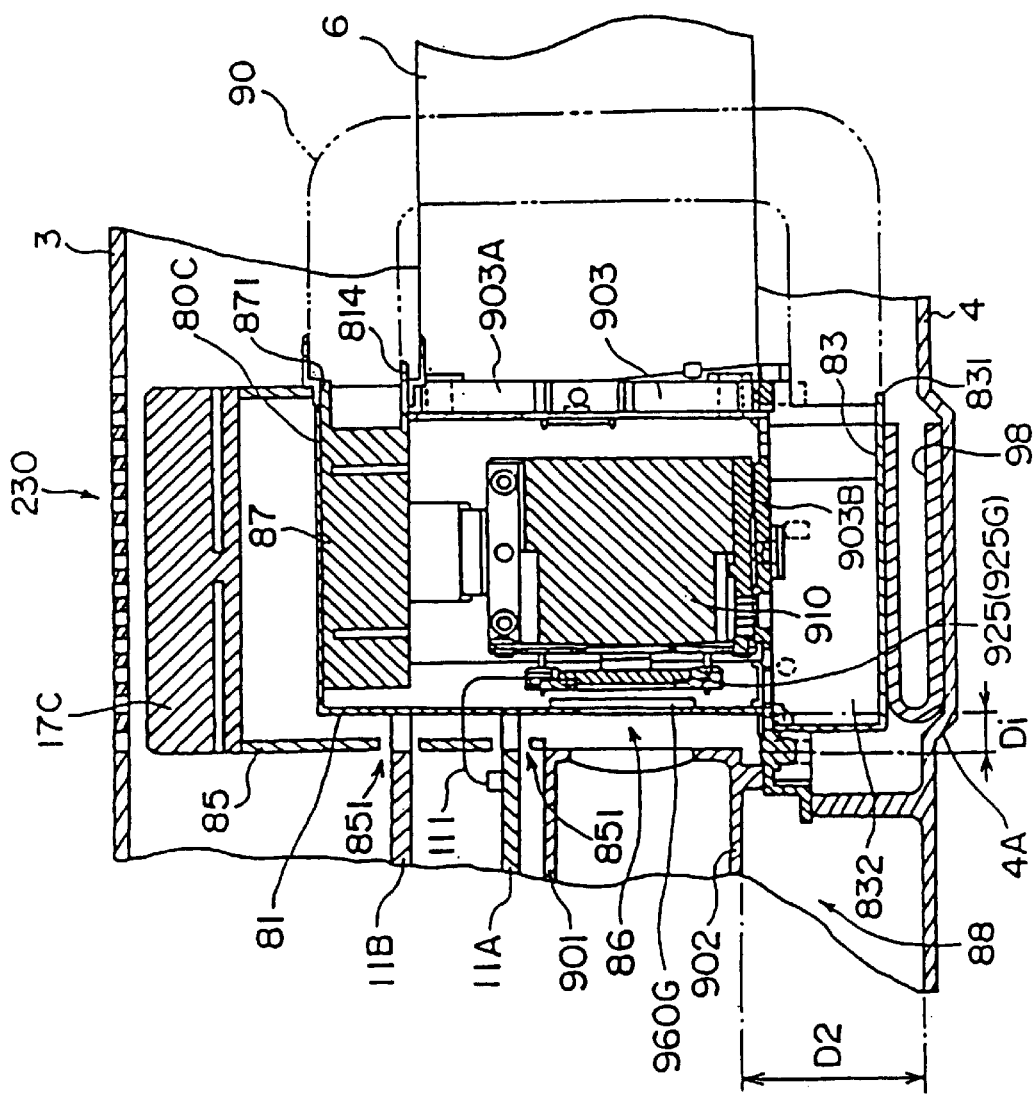
FIG. 20 is a vertical sectional view showing an enclosing structure in a fourth embodiment.

The fourth embodiment of the present invention will now be described with reference to FIG. 20. In the enclosing structure according to the third embodiment, the Peltier element 95 is provided between the lower cover member 83 and the lower casing 4, and is bonded and fixed on the inner peripheral surface of the lower casing 4 by the silicone-based bonding agent 97.

In contrast, in an enclosing structure according to the fourth embodiment, an inverted truncated cone-like recess 4A is formed in a lower casing 4 correspondingly to the lower surface of a lower cover member 83, and a platelike graphite sheet 98 is bent and accommodated between the lower cover member 83 of the enclosed box 80 and the recess 4A of the lower casing 4 in an urged state.

After bending the graphite sheet 98 to be accommodated on the recess 4A, the enclosed box 80 is disposed on the recess 4A. Then, elastic force is generated on the graphite sheet 98 by being bent, and adherence to the lower cover member 83 and the lower casing 4 is increased. Furthermore, the graphite sheet 98 is securely fixed by the recess 4A formed in the lower casing 4. Of course, the graphite sheet 98 may be pressed into contact with, or bonded to the lower cover member 83 and the lower casing 4 using a member for pressing the graphite sheet 98.

With the described configuration, the heat accumulated in the lower cover member 83 is sequentially discharged to the outside of the device, as described below.

By the heat exchange with air inside the enclosed box 80D, the heat generated on the surface of the enclosed box 80 is transmitted to the lower casing 4 via the graphite sheet 98, and discharged to the outside from the lower casing 4. Furthermore, the graphite sheet 98 is incorporated in the middle of the optical modulation device cooling flow path 43, and is also cooled by cooling air flowing in the optical modulation device cooling flow path 43. More specifically, the cooling air receives heat radiated from the graphite sheet 98 after sequentially cooling the air circulation path 90, the second power supply block 7B, and the main board 12, passes through the opening 9023 to cool the light source lamp unit 8, and is exhausted by the exhaust fan 16 from the air outlet 160.

According to the above-described embodiment, two advantages as described below can be newly obtained in addition to the advantages obtained by the projector in the above-described third embodiment.

(33) Since a sheet of the graphite sheet 98 is disposed between the second cover member and the outer casing in an urged state, adhesion of both members can be secured without using a bonding agent or the like, and assembling work can be facilitated.

(34) Since the lower casing 4 has the inverted truncated cone-shaped recess 4A and the graphite sheet 98 is accommodated on the bottom surface of the recess 4A whose height is lower than the periphery by one step, the graphite sheet 98 does not shift during assembly, and assembling work can be further facilitated.

Figure 21:
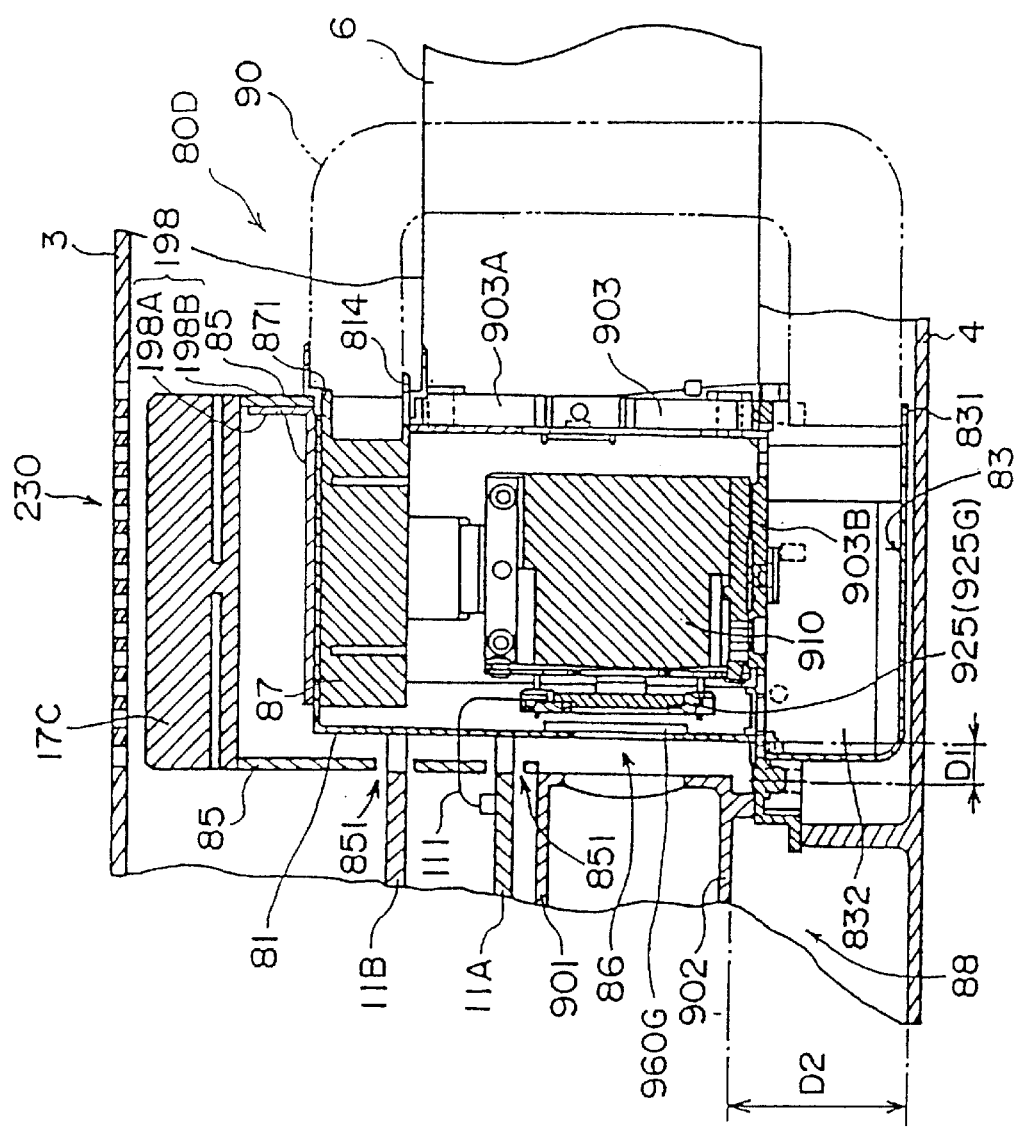
FIG. 21 is a vertical sectional view showing an enclosing structure in a fifth embodiment.

The fifth embodiment of the present invention will now be described with reference to FIG. 21. According to the enclosing structure in the fourth embodiment, nothing is provided on the upper surface of the upper cover member 81, and cooling air drawn by the intake fan 17C is in direct contact with the upper surface of the upper cover member 81.

In contrast, according to an enclosing structure in the fifth embodiment, a platelike graphite sheet 198 is disposed on the first cover member 81, and an upstanding surface 198A formed by bending a part of the edge of the graphite sheet 198 is connected to the cover member 85.

With the described configuration, the heat generated at the incident-side polarizers 960R, 960G, and 960B and accumulated in the upper cover member 81 is discharged to the outside as described below.

1. By the heat exchange with the air inside the enclosed box 80, the heat generated on the surface of the enclosed box 80 is transmitted to the cover member 85 via the graphite sheet 198.

2. Cooling air introduced by the intake fan 17C to the inside of the device spreads along the upper surface of the enclosed box 80 while cooling the cover member 85 and the graphite sheet 198. However, since the upstanding surface 198A is formed on the graphite sheet 198, spreading toward the projection lens 6 is controlled.

3. The spread cooling air flows downward along the three side surfaces of the enclosed box 80 to cool the side surfaces of the enclosed box 80, and cools the incident-side polarizers 960R, 960G, and 960B.

According to the above-described embodiment, two advantages as described below can be newly obtained in addition to the advantages obtained by the projector in the above-described fourth embodiment.

(35) External cooling air drawn in by the intake fan 17C quickly makes heat exchange between the cover member 85 and the graphite sheet 198 while flowing along the surface of the cover member 85 and the surface of the graphite sheet 198, whereby the enclosed box 80D can be further efficiently cooled.

(36) Since flowing of the cooling air drawn by the intake fan 17C toward the projection lens 6 is controlled by the upstanding surface 198A provided toward the projection lens 6, the enclosed box 80 can be further efficiently cooled.

The present invention is not limited to the above-described embodiment, and includes the following modifications.

That is, while the circulating fan disposed inside the enclosing structure is the centrifugal fan 87 in the first embodiment, an axial flow fan commonly used for cooling inside the projector may be adopted.

While the centrifugal fan 87 is projected from the projection-lens mounting portion 903A of the head body 903 in the first embodiment, the provision of the centrifugal fan 87 is not limited thereto. That is, when the flange projecting toward the outside of the radial direction of the projection lens 6 is provided at the base end of the projection lens 6, and the projection lens 6 is mounted to the head body 903 by joining the flange and the projection-lens mounting portion 903A, the centrifugal fan may be disposed at a portion corresponding to an inner area of the outer peripheral edge of the flange of the radial direction so as not to project toward the outside in the radial direction of the outer peripheral edge of the flange.

When the centrifugal fan is disposed in this way, the height of the enclosing structure can be lowered. Therefore, the projector can be easily reduced in size and thickness.

Furthermore, while the air circulation path 90 is disposed in the second power supply block cooling flow path 42 in the first embodiment, it may be disposed in the first power supply block cooling flow path 41. In short, if the air circulation path is disposed in a cooling flow path for cooling inside the projector, action and effect similar to the action and effect described in the above embodiments can be obtained.

While the air circulation path 90 is composed of the aluminum pipe-like member 91 and the elbow 92 in the first embodiment, it may be composed of other metal pipe-like member, such as copper having superior heat conductivity. Furthermore, the air circulation path may be formed by bending the pipe-like member into a semicircular shape. When the air circulation path is formed in this way, a pressure loss in pipe inside the air circulation path is reduced, and air in the enclosed portion can be quickly circulated.

Figure 22:
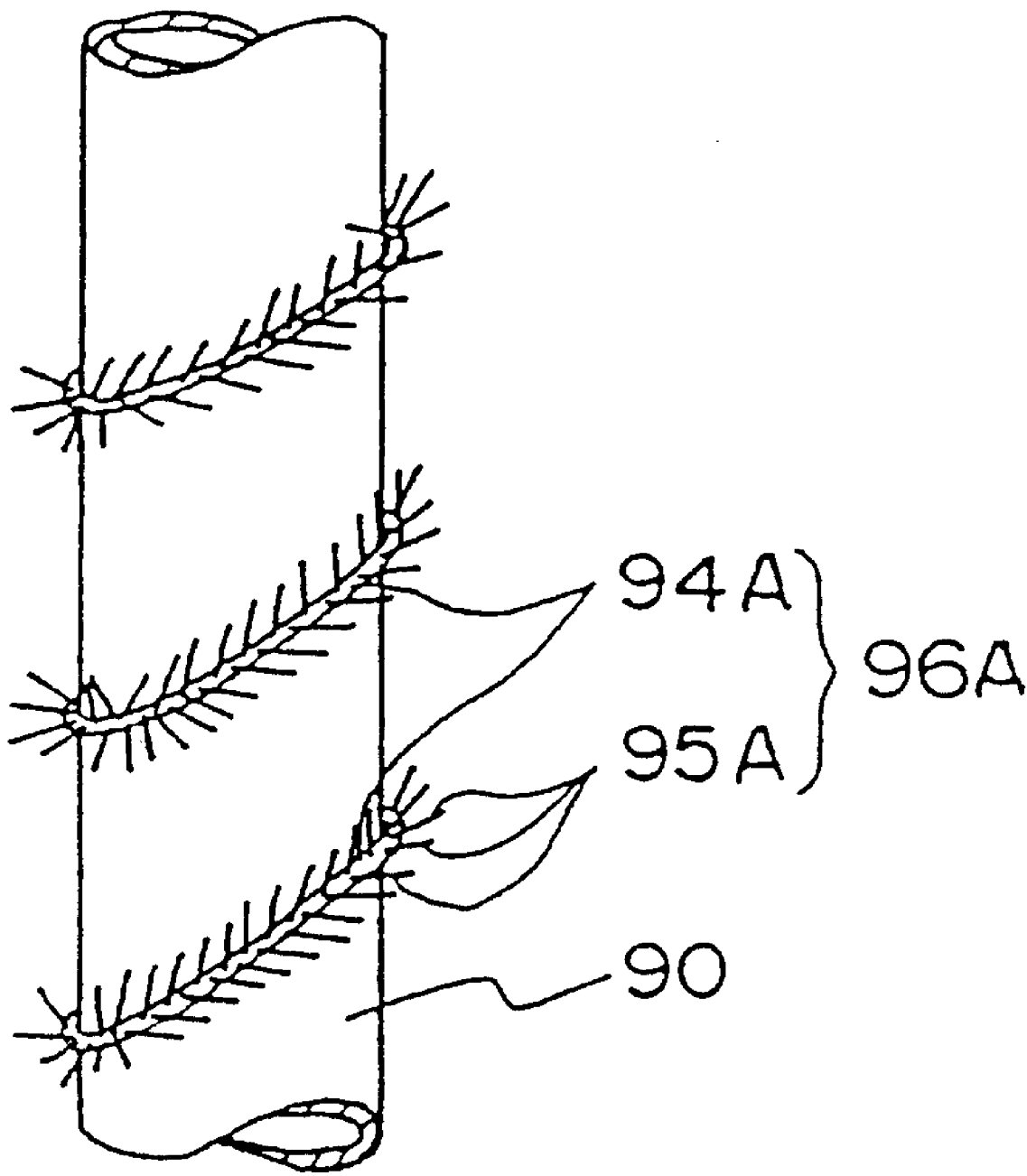
FIG. 22 is a diagram showing a radiating structure in a modification of the present invention.

Furthermore, the radiating structure of the air circulation path 90 in the first embodiment is composed of ring-like radiating fins 93 provided on the pipe-like member 91, the radiating structure is not limited thereto. That is, as shown in FIG. 22, the radiating structure may be formed by spirally winding a linear material 96A comprising a linear core member 94A and a plurality of radiating pieces 95A projected toward the outside of the radial direction of the core material 94A around the air circulation path 90.

Figure 23:
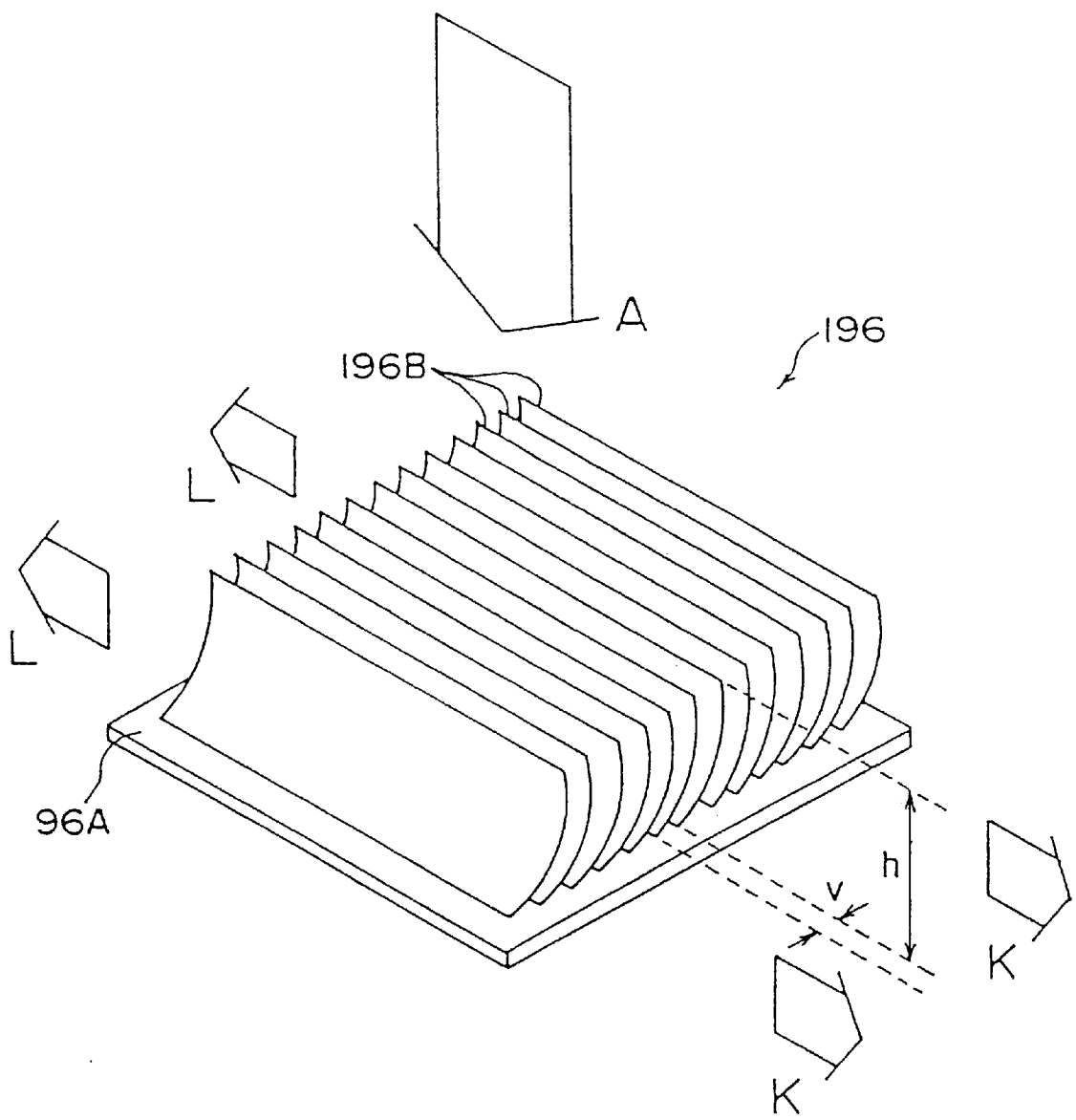
FIG. 23 is a perspective view showing a cooling fin in a modification of the present invention.

While the cooling structure provided in the middle of the optical modulation device cooling flow path 43 in the second embodiment is the cooling fin 96 having columnar projections 96B standing on the rectangular bottom plate thereof, the cooling structure is not limited thereto. That is, as shown in FIG. 23, a cooling fin 196 having a plurality of metal curved plates 196B disposed successively at predetermined intervals in one direction on a base plate 96A may be adopted to the present invention. The cooling fin 196 may be formed by successively disposing curved plates 196B each having a thickness of 0.1 mm to 0.2 mm, and a height h of 20 mm at intervals v of 0.5 mm. With the described configuration, the cooling air flowing downward from above makes heat exchange while flowing along the surfaces of the curved plates 196B, and is then flown out in the directions K and L.

While the upper cover member 81 is composed of the first side plate 811 and the second side plate in the above-described embodiments, the upper cover member may be integrally formed. If the upper cover member is integrally formed in this way, portions to be joined via the seal material can be reduced in the enclosing structure. Therefore, airtight of the enclosing structure can be more easily secured.

Furthermore, while the optical modulation device 925 is composed of TFT-drive liquid crystal panels 925R, 925G, and 925B, the present invention may be applied to a projector including an optical modulation device formed by another driving method.

In addition, while the optical modulation device 925 is composed of the three liquid crystal panels 925R, 925G, and 925B in the above-described embodiments, the present invention may be applied to an optical modulation device composed of a single or two liquid crystal panels.

Furthermore, in the liquid crystal panels 925R, 925G, and 925B, at least one of glass members for sealing liquid crystal may be replaced with a material having thermal conductivity of 10 W/m·K or more with respect to thermal conductivity of 1.2 W/m·K of a plate member formed of a common material, such as sapphire glass including aluminum oxide. By adopting the sapphire glass, the thermal conductivity is increased to 42 W/m·K, heat generated on the liquid crystal panel by blocking a part of light to be modulated can be extremely efficiently exchanged with air inside the enclosed portion, and cooling efficiency of the optical modulation device in the enclosed portion can be remarkably increased.

While the panels constituting the optical modulation device 925 are composed of liquid crystal elements in the above-described embodiments, the present invention may be applied to a projector including an optical modulation device composed of device panels using plasma elements or micromirrors other than the liquid crystal.

Furthermore, while the optical modulation device 925 in the above-described embodiments is of a type that transmits and modulates the luminous fluxes R, G, and B, the present invention may be applied to a projector including a reflective optical modulation device which modulates while reflecting and emits incident light.

Other specific structures, shapes, and the like for carrying out the present invention may be replaced with other structures and the like as long as the object of the present invention can be achieved.

What is claimed is:

1. A projector, comprising:
   a light source;
   a color separation optical system that includes a plurality of optical elements and separates a light emitted from the light source into a plurality of color lights;
   an optical component housing that holds the plurality of optical elements;
   a plurality of optical modulation devices, each of the optical modulation devices modulates the color light separated by the color separation optical system;
   a prism that synthesizes the color light modulated by the optical modulation devices;
   a projection lens that projects a light synthesized by the prism;
   an enclosing box that encloses an optical path from the plurality of optical modulation devices to the projection lens, the enclosing box accommodates the plurality of optical modulation devices and the prism, and the enclosing box is provided separately from the optical component housing;
   a pipe attached to the enclosing box, an air inside the enclosing box circulates through the pipe; and
   an outer casing that accommodates the light source, the optical component housing, the enclosing box, and the pipe.

2. The projector according to claim 1, wherein the pipe is formed of a metal.

3. The projector according to claim 1, the pipe being detachable from the enclosing structure, and the pipe and the enclosing structure being connected via a seal material.

4. The projector according to claim 1, the pipe including a radiating structure that releases heat inside the pipe to outside the pipe.

5. The projector according to claim 4, the radiating structure including a plurality of radiating fins extending toward outside of the radial direction of the pipe.

6. The projector according to claim 4, the radiating structure being constructed by spirally winding a linear material comprising a linear core member and a plurality of radiating pieces projected toward outside of the radial direction of the core member around the pipe.

7. The projector according to claim 1, the pipe being disposed aside the projection lens.

8. The projector according to claim 1, a cooling fan that cools the inside of the projector being provided in the vicinity of the pipe.

9. The projector according to claim 1, each of the optical modulation devices comprising a pair of substrates and an electrooptic substance clamped between the substrates, and a material having a thermal conductivity of 10 W/m·K or more being used for at least one of the substrate.

10. A projector, comprising:
    a light source;
    a color separation optical system that includes a plurality of optical elements and separates a light emitted from the light source into a plurality of color lights;
    an optical component housing that holds the plurality of optical elements;
    a plurality of optical modulation devices, each of the optical modulation devices modulates the color light separated by the color separation optical system;
    a prism that synthesizes the color light modulated by the optical modulation devices;
    a projection lens that projects a light synthesized by the prism;
    an enclosing box that encloses an optical path from the plurality of optical modulation devices to the projection lens, the enclosing box accommodates the plurality of optical modulation devices and the prism, and the enclosing box is provided separately from the optical component housing;
    a pipe attached to the enclosing box, an air inside the enclosing box circulates through the pipe;
    a circulating fan that is disposed inside the enclosing box and flows air inside the enclosing box; and
    an outer casing that accommodates the light source, the optical component housing, the enclosing box, and the pipe.

11. The projector according to claim 10, the circulating fan being a centrifugal fan that exhausts air drawn by the rotation of the fan in the direction tangential to the rotation.

12. The projector according to claim 11, wherein the enclosing box has an electro-optical apparatus placing portion that places the optical modulation devices, and the centrifugal fan is disposed above the optical modulation devices and an intake surface thereof opposing the electro-optical apparatus placing portion.

13. The projector according to claim 12, the enclosing box having a projection-lens mounting portion that mounts thereto the projection lens, a flange projecting toward outside of the radial direction of the projection lens being provided at the base end of the projection lens, the flange and the projection-lens mounting portion being joined, the projection lens being mounted to the enclosing box, and the centrifugal fan being disposed at a portion corresponding to an inner area of the outer peripheral edge of the flange in the radial direction so as not to project toward outside of the radial direction of the outer peripheral edge of the flange.

14. The projector according to claim 12, wherein one end of the pipe is connected to an air outlet of the centrifugal fan and the other end of the pipe is connected to a lower portion of the enclosing box.

15. The projector according to claim 14, further comprising a straightening plate that divides air ejected from the pipe according to the layout of the plurality of optical modulation devices.

16. The projector according to claim 15, the plurality of optical modulation devices being a red optical modulation device, a green optical modulation device, and a blue optical modulation device that modulate each of a red luminous flux, a green luminous flux, and a blue luminous flux; and the straightening plate being constructed so as to guide the air ejected from the pipe in the order of the blue optical modulation device, the green optical modulation device, and the red optical modulation device.

17. The projector according to claim 10, wherein a clearance of 1 mm to 5 mm is formed between the enclosing box and the optical modulation devices.

18. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
an enclosing box that encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe; and
a cooling structure that is provided on the enclosing box and cools an air inside the enclosing box; and
an outer casing that accommodates the light source, the optical component housing, the enclosing box, the pipe, and the cooling structure.

19. The projector according to claim 18, the cooling structure including a cooling fin provided on the outer surface of the enclosing box.

20. The projector according to claim 19, the cooling fin including a metal base plate, and a plurality of columnar projections projected on the base plate.

21. The projector according to claim 20, the cooling structure including a Peltier element provided on the outer surface of the enclosing box.

22. The projector according to claim 21, a circulating fan that circulates air inside the enclosing box being provided above or below the optical modulation devices, and the Peltier element being provided on the outer surface of the enclosing box located on the opposite side of the circulating fan across the optical modulation devices.

23. The projector according to claim 22, wherein the circulating fan is provided above the optical modulation devices, the outer casing is made of a metal, and the Peltier element is provided on the lower surface of the enclosing box and is fixed to the inner surface of the outer casing.

24. The projector according to claim 18, the cooling structure including a graphite sheet connected to the enclosing box at one end thereof, and connected to a metal part constituting the projector at the other end thereof.

25. The projector according to claim 24, wherein the outer casing is made of a metal and the graphite sheet is disposed between the lower surface of the enclosing box and the inner surface of the outer casing.

26. The projector according to claim 25, a recess that accommodates the graphite sheet being formed in the inner surface of the outer casing on which the graphite sheet is disposed.

27. The projector according to claim 24, further comprising:
an intake fan that guides external air to the inside of the device as cooling air; and
a cover member that guides the cooling air drawn by the intake fan to the outer peripheral portion of the enclosing box, wherein
the graphite sheet is disposed on the upper surface of the enclosing box, and connected to the cover member.

28. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
an enclosing box that encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe;
an outer casing that accommodates the light source, the optical component housing, the enclosing box, and the pipe;
an intake fan that draws external air to the inside of the outer case being disposed above the enclosing box; and
a cooling-air introduction path that guides cooling air drawn by the intake fan being formed in a boundary of the enclosing structure and the optical component housing.

29. The projector according to claim 28, the cooling-air introduction path being a clearance formed along a boundary of the enclosing box and the optical component housing, and the clearance size being set at 1 mm to 10 mm.

30. The projector according to claim 28, a cover member being provided between the boundary of the optical component housing along the cooling-air introduction path and the intake fan so as to surround the cooling-air introduction path.

31. The projector according to claim 30, further comprising:
a driving circuit board disposed above the optical component housing that drives the optical modulation devices, a cooling-air introducing opening that partially guides cooling air from the cooling fan to the driving circuit board being formed in the cover member.

32. The projector according to claim 28, further comprising:
an exhaust fan that exhausts air inside the outer casing to outside the casing; and
an exhausting flow path that guides cooling air that has cooled the enclosing box to the exhaust fan being provided between the lower surface of the optical component housing and the inner bottom surface of the outer casing.

33. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
a structure that includes an electro-optical apparatus placing portion that places the plurality of optical modulation devices and the prism and a projection-lens mounting portion that mounts the projection lens;
an enclosing box that is attached to the electro-optical apparatus placing portion and encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe; and
an outer casing that accommodates the light source, the optical component housing, the structure, the enclosing box, and the pipe.

34. The projector according to claim 33, the enclosing box including a first cover member attached to one side of the electro-optical apparatus placing portion, and a second cover member attached to the opposite side of the electro-optical apparatus placing portion.

35. The projector according to claim 34, the first cover member including a first side plate disposed on the electro-optical apparatus placing portion so as to surround the optical modulation devices, and a second side plate disposed substantially in parallel with the electro-optical apparatus placing portion to cover an end face of the first side plate.

36. The projector according to claim 35, an opening that guides the luminous flux to the optical modulation device being formed in the first side plate.

37. The projector according to claim 36, a transparent plate being attached to the opening via a seal material.

38. The projector according to claim 37, an incident-side polarizer constituting the optical modulation devices being put on the transparent plate.

39. The projector according to claim 36, further comprising:
a driving circuit board that drives the optical modulation devices; and
an electric wiring member that electrically connects the driving circuit board and the optical modulation devices, a wire insertion hole for inserting thereinto the electric wire member being formed in the first cover member.

40. The projector according to claim 39, the first cover member including a cutout formed by partially cutting out an end of the first side plate, and an engaging part formed on the second side plate and engaging the cutout, and the wire insertion hole being formed as a clearance between the cutout and the engaging part.

41. The projector according to claim 39, an elastic packing that seals the wire insertion hole being provided.

42. The projector according to claim 41, the electric wiring member including a flexible wiring board, and a slit for inserting thereinto the flexible wiring board being formed in the elastic packing.

43. The projector according to claim 33, each of the optical modulation devices comprising a pair of substrates and an electro-optical substance clamped between the substrates, and a material having a thermal conductivity of 10 W/m·K or more being used for at least one of the substrate.

44. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
a structure that includes an electro-optical apparatus placing portion that places the plurality of optical modulation devices and the prism and a projection-lens mounting portion that mounts the projection lens;
an enclosing box that is attached to the electro-optical apparatus placing portion and encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe;
a circulating fan that is disposed inside the enclosing box and flows air inside the enclosing box; and
an outer casing that accommodates the light source, the optical component housing, the structure, the pipe, and the enclosing box.

45. The projector according to claim 44, the circulating fan being a centrifugal fan that exhausts air drawn by the rotation of the fan in the direction tangential to the rotation.

46. The projector according to claim 45, the centrifugal fan being disposed above the optical modulation devices and an intake surface thereof opposes the electro-optical apparatus placing portion.

47. The projector according to claim 46, a flange projecting to outside of the radial direction of the projection lens being provided at the base end of the projection lens, and the flange and the projection-lens mounting portion being joined, the projection lens being mounted to the structure, and the centrifugal fan being disposed at a portion corresponding to an inner area of the outer peripheral edge of the flange in the radial direction so as not to project toward the outside of the radial direction of the outer peripheral edge of the flange.

48. The projector according to claim 46, the pipe being connected to an air outlet of the centrifugal fan at one end thereof, and connected to a lower portion of the enclosing box at the other end thereof.

49. The projector according to claim 48, further comprising a straightening plate that divides air ejected from the pipe according to the layout of the plurality of optical modulation devices.

50. The projector according to claim 49, the plurality of optical modulation devices being a red optical modulation device, a green optical modulation device, and a blue optical modulation device that modulate each of a red luminous flux, a green luminous flux, and a blue luminous flux, and the straightening plate being constructed so as to guide the air ejected from the pipe in the order of the blue optical modulation device, the green optical modulation device, and the red optical modulation device.

51. The projector according to claim 44, wherein a clearance of 1 mm to 5 mm is formed between the enclosing box and the optical modulation devices.

52. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
a structure that includes an electro-optical apparatus placing portion that places the plurality of optical modulation devices and the prism and a projection-lens mounting portion that mounts the projection lens;
an enclosing box that is attached to the electro-optical apparatus placing portion and encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe;
a cooling structure that is provided on the enclosing box and cools an air inside the enclosing box; and
an outer casing that accommodates the light source, the optical component housing, the structure, the enclosing box, and the pipe.

53. The projector according to claim 52, the cooling structure including a cooling fin provided on the outer surface of the enclosing box.

54. The projector according to claim 53, the cooling fin including a metal base plate, and a plurality of columnar projections projected on the base plate.

55. The projector according to claim 54, the cooling structure including a Peltier element provided on the outer surface of the enclosing box.

56. The projector according to claim 55, a circulating fan that circulates air inside the enclosing box being provided above or below the optical modulation devices, and the Peltier element being provided on the outer surface of a portion of the enclosing box located on the opposite side of the circulating fan across the optical modulation devices.

57. The projector according to claim 56, wherein the circulating fan is provided above the optical modulation devices, the outer casing is made of a metal, and the Peltier element is provided on the lower surface of the enclosing box and is fixed to the inner surface of the outer casing.

58. The projector according to claim 52, the cooling structure including a graphite sheet connected to the enclosing box at one end thereof, and connected to a metal part of the projector at the other end thereof.

59. The projector according to claim 58, wherein the outer casing is made of a metal and the graphite sheet is disposed between the lower surface of the enclosing box and the inner surface of the outer casing.

60. The projector according to claim 59, a recess that accommodates therein the graphite sheet being formed in the inner surface of the outer casing on which the graphite sheet is disposed.

61. The projector according to claim 58, further comprising:
an intake fan that guides external air to the inside of the projector as cooling air; and
a cover member that guides the cooling air drawn by the intake fan to the outer peripheral portion of the enclosing box, wherein
the graphite sheet is disposed on the upper surface of the enclosing box and connected to the cover member.

62. A projector, comprising:
a light source;
a color separation optical system that includes a plurality of optical elements and separates a light emitted from the light source into a plurality of color lights;
an optical component housing that holds the plurality of optical elements;
a plurality of optical modulation devices, each of the optical modulation devices modulates the color light separated by the color separation optical system;
a prism that synthesizes the color light modulated by the optical modulation devices;
a projection lens that projects a light synthesized by the prism;
a structure that includes an electro-optical apparatus placing portion that places the plurality of optical modulation devices and the prism and a projection-lens mounting portion that mounts the projection lens;
an enclosing box that is attached to the electro-optical apparatus placing portion and encloses an optical path from the plurality of optical modulation devices to the projection lens, the enclosing box accommodates the plurality of optical modulation devices and the prism, and the enclosing box is provided separately from the optical component housing;
a pipe attached to the enclosing box, an air inside the enclosing box circulates through the pipe;
a cooling structure that is provided on the enclosing box and cools an air inside the enclosing box;
an outer casing that accommodates the light source, the optical component housing, the structure, the enclosing box, and the pipe;
an intake fan that draws external air to the inside of the outer case being disposed above the enclosing box; and
a cooling air-introduction path that guides cooling air drawn by the intake fan being formed in a boundary of the enclosing structure and the optical component housing.

63. The projector according to claim 62, the cooling-air introduction path being a clearance formed along a boundary of the enclosing box and the optical component housing, and the clearance size being set at 1 mm to 10 mm.

64. The projector according to claim 62, a cover member being provided between the boundary of the optical component housing along the cooling-air introduction path and the intake fan so as to surround the cooling-air introduction path.

65. The projector according to claim 64, further comprising:
- a driving circuit board disposed above the optical component housing that drives the optical modulation devices; and
- a cooling-air introducing opening that partially guides cooling air from the cooling fan to the driving circuit board being formed in the cover member.

66. The projector according to claim 62, further comprising:
- an exhaust fan that exhausts air inside the projector to outside the device; and
- an exhausting flow path that guides cooling air that has cooled the enclosing box, to the exhaust fan being provided between the lower surface of the optical component housing and the inner bottom surface of the outer casing.

* * * * *